(12) United States Patent
Omoto et al.

(10) Patent No.: US 9,188,462 B2
(45) Date of Patent: Nov. 17, 2015

(54) ROTATION SENSOR-EQUIPPED BEARING

(75) Inventors: Kaoru Omoto, Kuwana (JP); Seiichi Takada, Kuwana (JP)

(73) Assignee: NTN CORPORATION, Osaka (JP)

( * ) Notice: Subject to any disclaimer, the term of this patent is extended or adjusted under 35 U.S.C. 154(b) by 216 days.

(21) Appl. No.: 13/805,349

(22) PCT Filed: Jun. 27, 2011

(86) PCT No.: PCT/JP2011/064664
§ 371 (c)(1),
(2), (4) Date: Dec. 19, 2012

(87) PCT Pub. No.: WO2012/002318
PCT Pub. Date: Jan. 5, 2012

(65) Prior Publication Data
US 2013/0099107 A1  Apr. 25, 2013

(30) Foreign Application Priority Data

Jun. 30, 2010 (JP) .................... 2010-149029
Sep. 17, 2010 (JP) .................... 2010-208831
Jun. 23, 2011 (JP) .................... 2011-139261

(51) Int. Cl.
G01D 5/26 (2006.01)
F16C 41/00 (2006.01)
G01D 5/14 (2006.01)
G01D 5/245 (2006.01)
G01D 11/24 (2006.01)
G01P 3/44 (2006.01)
(Continued)

(52) U.S. Cl.
CPC  *G01D 5/26* (2013.01); *F16C 33/02* (2013.01); *F16C 41/007* (2013.01); *G01D 5/145* (2013.01); *G01D 5/2451* (2013.01); *G01D 5/34738* (2013.01); *G01D 11/245* (2013.01); *G01P 3/443* (2013.01); *G01P 3/487* (2013.01)

(58) Field of Classification Search
USPC .......................... 250/231.13–231.18, 237 G
See application file for complete search history.

(56) References Cited

U.S. PATENT DOCUMENTS 5,155,401 A * 10/1992 Kanaya et al. ............... 310/89
5,198,738 A *  3/1993 Blaser et al. ............... 318/652
(Continued)

FOREIGN PATENT DOCUMENTS

JP  59-7780  1/1984
JP  5-60167  8/1993
(Continued)

OTHER PUBLICATIONS

International Preliminary Report on Patentability mailed Feb. 21, 2013, issued in corresponding PCT Patent Application No. PCT/JP2011/064664.
(Continued)

*Primary Examiner* — Tony Ko

(57) ABSTRACT

A bearing unit is provided in an inner peripheral portion of a sensor housing in which a sensor portion is installed. The sensor portion includes a sensor mounting substrate and a sensor fixed to this sensor mounting substrate. The sensor housing is provided with an axially extending substrate mounting groove formed in a direction of a chord which will define the circular section of the outer peripheral surface of the sensor housing. The sensor mounting substrate is mounted on this substrate mounting groove to install the sensor portion within the sensor housing.

21 Claims, 21 Drawing Sheets

(51) Int. Cl.
*G01P 3/487* (2006.01)
*F16C 33/02* (2006.01)
*G01D 5/347* (2006.01)

(56) References Cited

U.S. PATENT DOCUMENTS

| | | |
|---|---|---|
| 7,569,808 B2 | 8/2009 | Yoshioka |
| 7,838,815 B2 | 11/2010 | Yamagata |
| 8,281,687 B2 | 10/2012 | Koma et al. |
| 2002/0145108 A1* | 10/2002 | Rodi ................ 250/231.14 |
| 2006/0250292 A1 | 11/2006 | Yamagata |
| 2007/0096018 A1 | 5/2007 | Yoshioka |
| 2009/0013821 A1 | 1/2009 | Koma et al. |
| 2011/0018529 A1 | 1/2011 | Soyama et al. |

FOREIGN PATENT DOCUMENTS

| | | |
|---|---|---|
| JP | 6-29375 | 4/1994 |
| JP | 10-267692 | 10/1998 |
| JP | 2006-266962 | 10/2006 |
| JP | 2006-300871 | 11/2006 |
| JP | 2006-300873 | 11/2006 |
| JP | 2007-121236 | 5/2007 |
| JP | 2007-224968 | 9/2007 |
| JP | 2007-309692 | 11/2007 |
| JP | 2007-316026 | 12/2007 |
| JP | 2009-36751 | 2/2009 |
| JP | 2009-244039 | 10/2009 |

OTHER PUBLICATIONS

International Search Report of Corresponding PCT Application PCT/JP2011/064664 mailed Sep. 13, 2011.

Japanese Notice of Reasons for Rejection issued Feb. 3, 2015 in corresponding Japanese Patent Application No. 2011-139261.

* cited by examiner

ROTATION SENSOR-EQUIPPED BEARING

CROSS REFERENCE TO THE RELATED APPLICATIONS

This application is a U.S. National Phase application of PCT/JP2011/064664 filed Jun. 27, 2011 and claims the priority benefit of Japanese Applications No. 2010-149029 filed Jun. 30, 2010, No. 2010-208831 filed Sep. 17, 2010, and No. 2011-139261 filed Jun. 23, 2011 in the Japanese Intellectual Property Office, the contents of which are incorporated herein by reference.

BACKGROUND OF THE INVENTION

1. Field of the Invention

The present invention relates to a rotation sensor equipped bearing assembly of a kind incorporated in, for example, a copying machine, a printer or any other business machines and equipments.

2. Description of Related Art

As a rotation sensor equipped bearing assembly having a rotation detecting function, a bearing assembly of a structure, in which an encoder is provided in an inner ring of a rolling bearing assembly, a sensor housing is provided in an outer ring serving as a stationary member, and the rotation of the encoder is detected by a sensor supported by the sensor housing, has been known. (In this respect, see, for example, the patent document 1 listed below.) Also, as a rotation sensor equipped bearing assembly, a bearing assembly of a structure, in which a rotation sensor is constituted by an encoder and a sensor unit and a bearing assembly is provided in an inner peripheral portion of a sensor housing having the sensor unit installed therein, has been known. (In this respect, see, for example, the patent document 2 listed below.)

Also, a bearing assembly of a structure, in which the rotation of a rotary shaft is detected by means of an optical rotary encoder including a casing to accommodate therein a code wheel (encoder) and a light transmissive type photo-sensor, has also been known. (In this respect, see, for example, the patent documents 3 to 5 listed below.) Yet, a bearing assembly of a structure, in which an encoder is provided in an inner ring serving as a rotatable member of the rolling bearing assembly and a sensor housing is provided in an outer ring serving as a stationary member and the rotation of the encoder is detected by means of an optical sensor supported in the sensor housing, has been known. (In this respect, see, for example, the patent documents 6 and 7 listed below.)

PRIOR ART LITERATURE

[Patent Document 1] JP Laid-open Patent Publication No. 2007-224968
[Patent Document 2] JP Laid-open Patent Publication No. 2006-266962
[Patent Document 3] JP Laid-open Patent Publication No. 2006-300871
[Patent Document 4] JP Laid-open Patent Publication No. 2006-300873
[Patent Document 5] JP Laid-open Patent Publication No. 2007-121236
[Patent Document 6] JP Laid-open Patent Publication No. 2007-309692
[Patent Document 7] JP Laid-open Patent Publication No. 2007-316026

The bearing assembly disclosed in the patent document 1 listed above has a problem in that, where the rotation sensor is mounted on the rolling bearing assembly, the encoder is fitted to the inner ring of the bearing assembly by means of a press fitting technique and, therefore, the encoder can not be reused, and also the bearing assembly or the sensor cannot be replaced independently. The bearing assembly disclosed in the patent document 2 listed above is of a structure in which a sensor mounting substrate having the sensor mounted thereon is provided on the side of installation of the bearing assembly relative to the sensor housing and the sensor cannot therefore be removed relative to the bearing assembly. For this reason, when the bearing assembly is desired to be replaced while no problem associated with, for example, any trouble is found in the sensor, the reuse of the sensor is no longer impossible. Also, since an electric connection with the sensor is accomplished directly without being routed through any wiring connector, the assemblage requires a substantial amount of labor and time to complete it.

In the rotation sensor equipped bearing assembly disclosed in the patent document 2 listed above, a ring shaped substrate having the sensor installed thereon is fitted to the sensor housing in coaxial relation with the bearing assembly in an axially juxtaposed fashion. For this reason, there has been found a problem that by a distance equal to the thickness of the substrate, the axial length of the rotation sensor equipped bearing assembly as a whole tends to become large. Also, fitting of the substrate to the sensor housing requires the use of an insert molding and, for this reason, the need is recognized to set the substrate in a mold during the molding, thus requiring a substantial amount of labor and time. In addition, where the rotation sensor equipped bearing assembly of the structure described above is to be provided on a shaft, if the shaft diameter differs, respective molds required to mold the sensor housing, the encoder and lid members for closing spaces between the sensor housing and the encoder must be necessarily changed, and also depending on the shaft shape, the substrate must also be changed, thus requiring various changes so that they can accommodate the shaft diameter. Also, since a stopper necessary to engage the encoder with the shaft is provided in a support member which is a component part of the encoder, the axial length of the rotation sensor equipped bearing assembly tends to be increased and, accordingly, the compactness of, for example, a copying machine that is to be incorporated will be adversely affected.

Also, according to the respective structures disclosed in the patent documents 3 to 5 listed above, in a business office equipment, since the bearing assembly and a rotary encoder are installed separately, a substantial amount of labor and time is required for the bearing assembly and the rotary encoder to be incorporated in the business office equipment. Also, where the transmissive type photo-sensor is utilized, since this photo-sensor is large in size, there is a tendency that the dimensions in a direction parallel to the rotary shaft will increase. In addition, where the rolling bearing assembly disclosed in any of the patent documents 6 and 7 listed above and the rotary encoder are integrated together, since the sensor is assembled in a sensor unit in a fashion the sensor cannot be removed from such sensor unit, the reuse of the sensor is impossible. Since the electric connection with the sensor is accomplished directly without being routed through the wiring connector, assemblage requires a substantial amount of labor and time. Yet, since in the case of the sensor unit utilizing a magnetic sensor, the encoder used therein must be of a type utilizing a magnet, it tends to become costly as compared with the sensor unit of a type utilizing an encoder made of, for example, a resinous material.

SUMMARY OF THE INVENTION

In view of the foregoing, the present invention has for its primary object to provide a rotation sensor equipped bearing assembly which can be easily disassembled or dismantled so that only a faulty or broken-down component part of one of the bearing assembly and the sensor mounting substrate can therefore be replaced to permit the other component part thereof to be reused; can be detached from an electric wiring section to enable it to be easy to handle; and in which by a simplified replacement of one or some component parts, various change in resolving power of the rotation detection and change in class of rotation detection such as, for example, a function of a simple rotation detection, a function of detecting the direction of rotation and a function of detecting the point of origin can be accomplished.

Another important object of the present invention is to provide a rotation sensor equipped bearing assembly of the type referred to above, which is compact in an axial direction and is easy to assemble and in which the number of component parts that are to be altered can be reduced even if the shape of the shaft changes.

In order to accomplish the foregoing objects of the present invention, the rotation sensor equipped bearing assembly designed in accordance with the present invention includes a sensor housing having a first end portion thereof provided with a bearing unit that contacts a shaft, an encoder mounted on the shaft and positioned within the sensor housing, and a sensor mounting substrate having mounted thereon a sensor and being removably installed within the sensor housing from a second end portion of the sensor housing that is opposite to the first end portion.

According to the above described construction, since the sensor mounting substrate is removably mounted on the sensor housing, which is integrated with the bearing unit, from the second end portion of the sensor housing, disengagement of one of the bearing unit and the sensor mounting substrate from the other of the bearing unit and the sensor mounting substrate is easy to accomplish and, therefore, only a component part of either one of the bearing unit and the sensor mounting substrate, which has become faulty or broken down, can be replaced, allowing the remaining component part or parts to be reused.

In the practice of the present invention, the sensor housing may be provided with an axially extending slit-like substrate mounting groove formed in a direction, which will become a chord of the circular section of an outer peripheral surface of the sensor housing, in which case the sensor mounting substrate is engaged in this mounting groove.

According to the above described construction, since the substrate mounting groove is provided so as to spread in a direction which will define a chord of the section of the outer peripheral surface of the sensor housing and the sensor mounting substrate is engaged in such substrate mounting groove, the sensor mounting substrate represents such a shape as to spread in the direction which will define the chord of the section of the outer peripheral surface of the sensor housing. Accordingly, unlike the product in which the sensor mounting substrate and the bearing unit are arranged having been axially juxtaposed, there is no need to increase dimension of the sensor housing in the axial direction by a quantity equal to the thickness of the sensor mounting substrate, and the rotation sensor equipped bearing assembly can assume a structure that is compact in the axial direction. Also, since by engaging in the substrate mounting groove, the sensor mounting substrate can be fitted, it is also excellent in assemblability.

The sensor housing axially neighboring the bearing unit may be provided with an encoder accommodating space defined at one end face of the sensor housing so as to open at such end face of the sensor housing, and the encoder is axially insertable within the encoder accommodating space, in which case the substrate mounting groove is opened at the end face of the housing and by means of a lid member to close the encoder accommodating space at the one end portion of the sensor housing, the substrate and the encoder are prevented from detaching. In the case of this construction, the lid member functions as a lid to close the encoder accommodating space and concurrently serves as a detachment preventing member for the encoder and the sensor mounting substrate, and, therefore, there is no need to use any extra stopper intended for detachment preventing purpose and the bearing assembly can be further compactly constructed in the axial direction.

For example, the sensor mounting substrate may protrude laterally outwardly from the substrate mounting groove, in which case a wiring connector is mounted on such the projecting portion of the substrate. The wiring connector is preferred to be exposed from the sensor housing surface so that connection with any other wiring can be easily accomplished According to the above construction, positioning of the wiring connector on the projecting portion of the sensor mounting substrate is effective to facilitate the mounting of the wiring connector with no need to expand a portion of the sensor mounting substrate that engages in the substrate mounting groove and, hence, not only can a further compactization be accomplished, but also wiring connection with the wiring connector can be eased.

In the present invention, the bearing unit may be a sliding bearing provided in an inner peripheral surface of the sensor housing. Such a sliding bearing may be, for example, an oil retaining bearing. In the case of this construction, the sensor housing plays a role of a bearing housing. The use of the sliding bearing, which is a separate member, is effective to increase a bearing function such as, for example, reduction in torque.

The substrate mounting groove may have opposite side edges thereof opening at an outer peripheral surface of the sensor housing. If the opposite side edges of the substrate mounting groove are made open, the sensor mounting substrate can have a transverse width enough to extend laterally from the substrate mounting groove and, hence, without increasing the dimension of the sensor housing, it becomes easy to secure a required dimension of the sensor mounting substrate.

In the present invention, the substrate mounting groove may have an encoder facing port communicated with the encoder accommodating space, in which case the sensor of the sensor mounting substrate engaged in the substrate mounting groove radially faces an outer peripheral surface of the encoder through a gap at a position of the encoder facing port. By so doing, even if the shaft diameter of the shaft changes, common component parts can be used in the sensor mounting substrate. In particular, where the sensor mounting substrate is fitted to the sensor housing so that the substrate surface may receive a magnetic force with a predetermined gap in a direction radially of the plane of rotation of the encoder, it becomes easy to use common component parts in the sensor mounting substrate regardless of the shaft diameter.

In the present invention, the substrate mounting groove in the sensor housing may be provided at a plurality of sites that are different from each other in a circumferential direction with the sensor mounting substrate engaged in each of those substrate mounting grooves. If a plurality of sensor mounting substrates are fitted to the sensor housing and the sensor is installed at a plurality of sites that are different from each other in the circumferential direction, the direction of rotation can be detected in addition to the detection of the rotational speed.

In the case of the above described construction, the sensor mounting substrate may be a circuit substrate having the sensor, electronic component parts that are connected with the sensor, and a wiring connector all mounted thereon, in which case the sensor and the wiring connector are arranged in a direction which will define the chord. Since the substrate mounting groove is of a shape spreading in the direction of the chord of the sensor housing with its opposite side edges opening, it is easy to increase dimension of the sensor mounting substrate in the direction of the chord. Also, by juxtaposing the sensor and the wiring connector in the direction of the chord, the axial dimension of the sensor mounting substrate can be reduced. As a result, the compactization of the axial dimension of the rotation sensor equipped bearing assembly can be further facilitated.

Where the lid is employed as hereinabove described, the lid member may be assembled in the sensor housing in the axial direction. By so doing, all of the sensor mounting substrate, the encoder and the lid member can be incorporated in the axial direction, resulting in a further increase of the assemblability.

Where as hereinabove described the opposite side edges of the substrate mounting groove are made to open at the outer peripheral surface of the sensor housing, the sensor is preferably fitted to the sensor mounting substrate at a site at which, even when the sensor is inserted in the substrate mounting groove in a fashion reversed leftwards or rightwards when viewed in an axial direction, the position of the sensor relative to the sensor housing remains the same. By so doing, it is possible to insert the sensor mounting substrate in a fashion reversed leftwards or rightwards and the wiring connection position or the like on the sensor mounting substrate can be arbitrarily chosen leftwards or rightwards. In particular, where the wiring connector is so arranged as to protrude laterally from the substrate mounting groove, as the built-up specification of the rotation sensor equipped bearing assembly, it is possible to cause the wiring connector to protrude in either leftwards or rightwards.

In this case, the substrate may be of a rectangular shape and then a bottom surface of the substrate mounting groove may be provided with a positioning recess or projection to position the substrate laterally, in which case a projection or a recess engageable with the positioning recess or projection in the bottom surface of the substrate mounting groove is provided at a side of the sensor mounting substrate along the bottom surface of the substrate mounting groove and a side of the sensor mounting substrate along the bottom surface of the substrate mounting groove in a position having been inserted in the leftward or rightward reversed fashion. Thanks to the engagement between the recess and the projection, the sensor mounting substrate can be positioned in a leftward or rightward direction. In particular, even when the sensor mounting substrate is to be incorporated in either one of the leftward and rightward directions, the positioning work can be simply accomplished. Also, concomitant with the structure in which the fixing in the axial direction is carried out by means of the lid member, the assemblability of the sensor mounting substrate is further increased and the fixing of the sensor mounting substrate also becomes assured.

The recess and projection for the positioning purpose as discussed above may be provided in the lid member. In other words, the sensor mounting substrate may be of a square shape and the lid member may then be provided with a positioning recess or projection for positioning the substrate laterally, in which case a projection or a recess engageable with the positioning recess or projection in the bottom surface of the substrate mounting groove is provided at a side of the sensor mounting substrate along the bottom surface of the substrate mounting groove and a side of the sensor mounting substrate along the bottom surface of the substrate mounting groove in a position having been inserted in the leftward or rightward reversed fashion. In this case, thanks to the engagement between the recess and the projection, the sensor mounting substrate can be positioned in a leftward or rightward direction. In particular, even when the sensor mounting substrate is to be incorporated in either one of the leftward and rightward directions, the positioning work can be simply accomplished. Also, concomitant with the structure in which the fixing in the axial direction is carried out by means of the lid member, the assemblability of the sensor mounting substrate is further increased and the fixing of the sensor mounting substrate also becomes assured.

In the present invention, the sensor housing may have a substrate installation window defined in a portion of a circumferential direction so as to extend from inside to outside, and vice versa, in a radial direction and may also have a substrate receiving portion comprised of a projection or a recess accommodated within the substrate installation window, in which case the sensor mounting substrate is received by the substrate receiving portion to be arranged within the substrate installation window and a wiring connected with the sensor mounting substrate is drawn from the substrate installation window towards an outer diametric side. In the case of this construction, since the sensor mounting substrate is installed within the substrate installation window after having been received by the substrate receiving portion, the removal of the sensor mounting substrate relative to the sensor housing equipped bearing unit can be further easily accomplished. Also, since the wiring for connecting with the sensor mounting substrate is drawn towards the outer diametric side through the substrate installation window, without the wiring constituting any obstruction the removal of the sensor mounting substrate can be performed.

In the present invention, the shaft may have a cutout defined in a circumferential portion of an outer peripheral surface, which cutout is of a shape formed by cutting to a flat surface, in which case the encoder has a circumferential portion of an inner peripheral surface provided with the flat surface area of a flat surface, which engages in the cutout. By so doing, the encoder can be inserted from the axial direction relative to the shaft and be then incorporated therein. Also, when the flat surface portion of the encoder engages in the cutout in the shaft, the encoder can be non-rotatably fitted to the shaft.

The sensor referred to above may face a to-be-detected surface of the encoder through an axial gap. In this case, despite the structure in which the bearing portion comprised of the sliding bearing and the housing portion are integrally provided having been axially juxtaposed relative to each other, the rotation sensor equipped bearing assembly can be constructed compact in the axial direction and the versatility can be enhanced particularly when the rotation sensor equipped bearing assembly is incorporated in a business office machine or equipment.

The sensor referred to above may face a to-be-detected surface of the encoder through a radial gap. In this case, the rotation sensor equipped bearing assembly can be constructed compact in the radial direction and the versatility can be enhanced particularly when the rotation sensor equipped bearing assembly is incorporated in a business office machine or equipment.

The encoder and the sensor, both referred to above, may have a point of origin detecting function.

In the present invention, the sensor referred to above may be an optical sensor. When the optical sensor is used as a sensor, the encoder made of the standard resinous material can be used. Where the encoder made of the resinous material is used, the cost can be reduced as compared with that of the conventional encoder made of a magnet material.

A light transmitting portion, formed by applying a slitting process to transmit light and a light reflecting portion to reflect light may be circumferentially alternately juxtaposed in the to-be-detected surface of the encoder. In this case, the sensor can detect in dependence on the presence or absence of reflected light. Also, the light transmitting portion and the light reflecting portion can be simply formed and the weight of the encoder can also be reduced.

A reflective material may be painted on the to-be-detected surface of the encoder. The sensor detects light reflected from the reflecting material, but is unable to detect at a site where no reflecting material is applied.

A recess and a projection may be circumferentially alternately formed in the to-be-detected surface of the encoder. In this case, the encoder is formed of a material excellent in, for example, light reflectance so that the recess and projection result in occurrence of the difference in intensity of the reflected light. The sensor outputs a signal proportional to the intensity of the reflected light.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
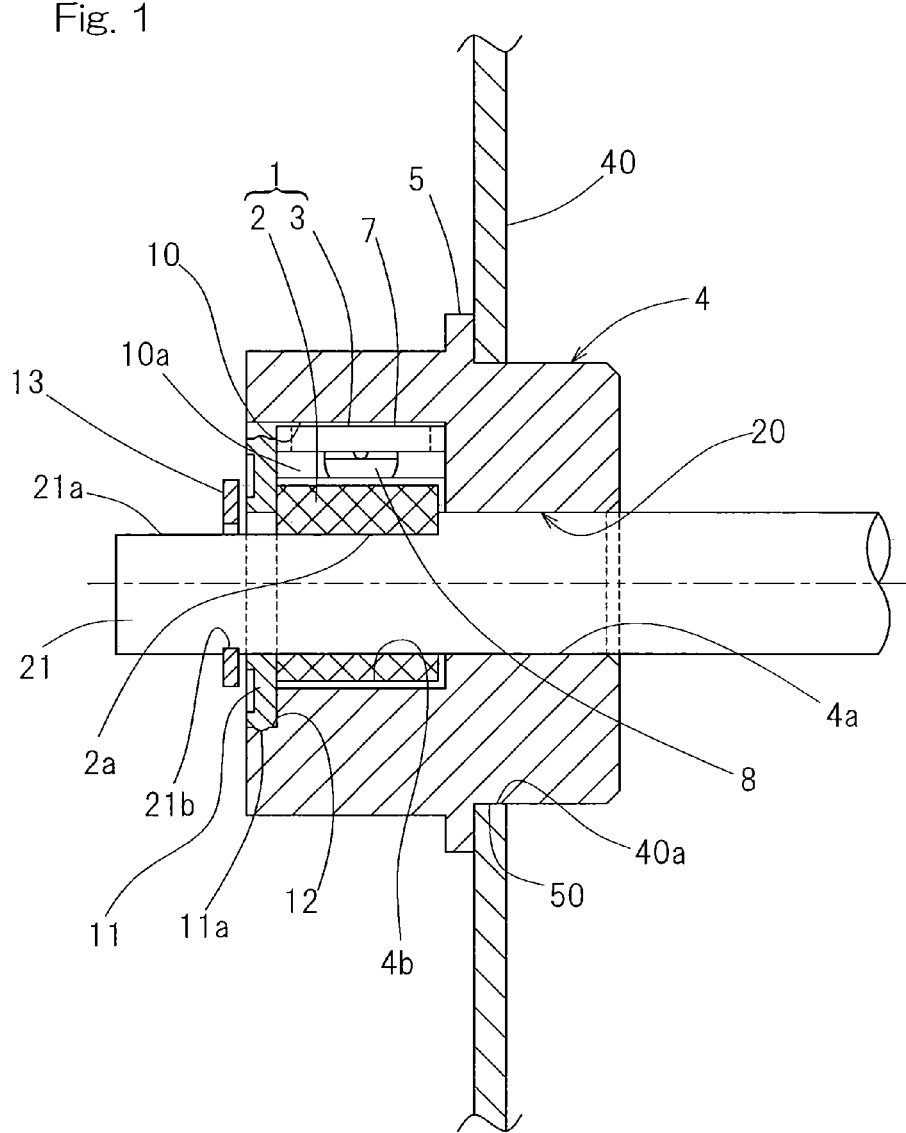
FIG. 1 is a longitudinal sectional view of a rotation sensor equipped bearing assembly designed in accordance with a first preferred embodiment of the present invention.

A first preferred embodiment of the present invention will be described in detail with particular referenced to FIGS. 1 to 5. The rotation sensor equipped bearing assembly according to this embodiment includes a rotation sensor 1 that is constituted by an encoder 2 and a sensor unit 3, a sensor housing 4 having the sensor unit 3 installed therein, and a bearing unit 20 provided in an inner peripheral portion of a shaft insertion hole 4a defined in the sensor housing 4 to rotatably support a shaft 21. The encoder 2 referred to above is fitted to the shaft 21 within the sensor housing 4 in an axially juxtaposed relation with the bearing unit 20.

Figure 2A:
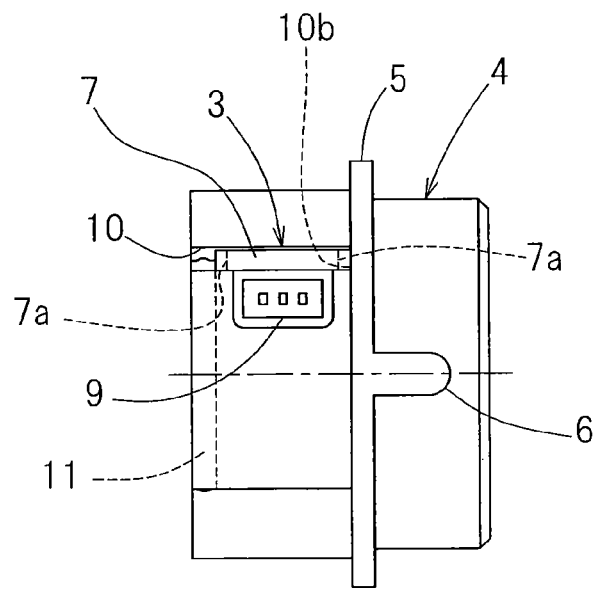
FIG. 2A is a front elevational view of the rotation sensor equipped bearing assembly.
Figure 3A:
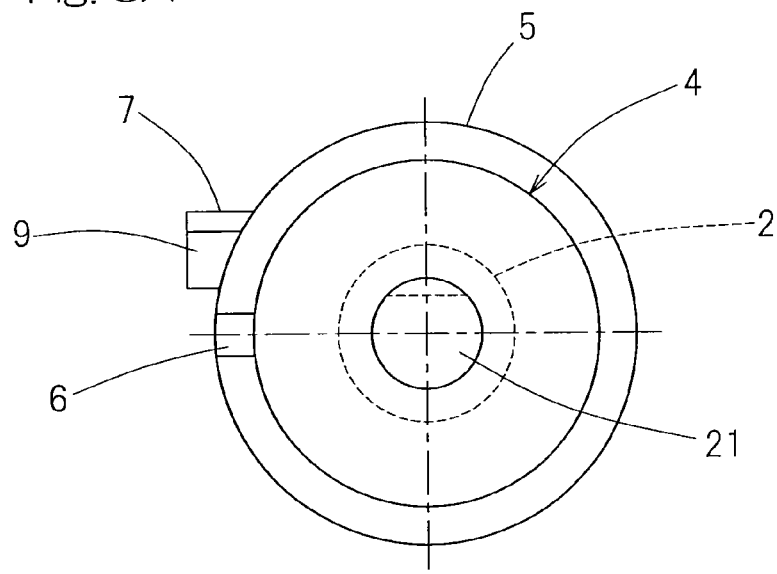
FIG. 3A is a right side view of the rotation sensor equipped bearing assembly.

The sensor housing 4 referred to above is a generally cylindrical member for enclosing an outer periphery of the encoder 2. The bearing unit 20 referred to above is in the form of a sliding bearing unit constituted by one axial end portion (axially right end portion of FIG. 1) of the shaft insertion hole 4a in the sensor housing 4. The shaft insertion hole 4a in the sensor housing 4 is rendered to be a stepped cylindrical surface having the other axial end portion (axially left end portion) which forms a large diameter side portion of such shaft insertion hole 4a, and the other axial end portion of the shaft insertion hole 4a defines an encoder accommodating space 4b of a diameter greater than a bearing surface of the bearing unit 20. Material for the sensor housing 4 is chosen to be a synthetic resin having a good sliding property that can function as a bearing unit. The sensor housing 4 has an outer peripheral portion formed over the entire circumference thereof integrally with a flanged positioning portion 5 and a machine mounting surface 50. When the positioning portion 5 referred to above is engaged with a housing 40 which will form a fitting frame of a machine or equipment in which the rotation sensor equipped bearing assembly of the embodiment is incorporated, the sensor housing 4 is axially positioned. An outer diametric portion on a bearing installing side end of the sensor housing 4 is, as best shown in FIG. 2A in a front elevational view, provided with, as a projection integral with the positioning portion 5, a detent member 6 engageable in the housing 40 of the equipment referred to above to thereby inhibit rotation of the housing 4. FIG. 3A illustrates a right side view of the rotation sensor equipped bearing assembly and the detent member 6 referred to above lies on the circumference of the positioning portion 5.

Figure 3B:
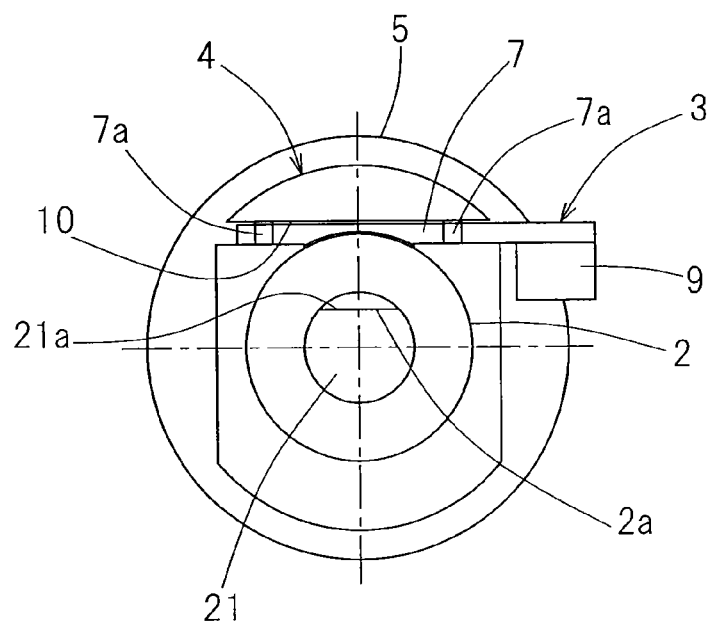
FIG. 3B is a left side view of the rotation sensor equipped bearing assembly.

Referring particularly to FIG. 1, the encoder 2 is in the form of a magnetic encoder made in its entirety of a magnetic material or in the form of a magnetic encoder of a structure in which a layer of the magnetic material is provided on a matrix of either a resinous material or a metallic material and has a magnetic force that can be detected by a sensor 8. The encoder 2 is constituted as a generally cylindrical member in which an annular magnetic body is externally fixedly mounted on a cylindrical support body that is externally mounted on the shaft 21, and the magnetic body has alternating magnetic poles N and S magnetized thereto in a circumferential direction at a predetermined pitch. It is to be noted that in the drawing the encoder 2 is not shown as having the support body and the magnetic body separately, but is shown as an integral body of those bodies. It is also to be noted that the encoder 2 may not have the support body referred to above and may be constituted solely by the magnetic body. A portion of the outer periphery of the shaft 21 ranging from one end thereof to a site that is supported by the bearing unit 20 is formed with a cutout 21a which is called a "D-cut" and which is rendered to be an axially extending flat surface. Also, as shown in FIG. 3B, an inner peripheral surface of the encoder 2 is formed with a flat surface area 2a engageable with the cutout 21a of the shaft 21 for detent purpose. In other words, the inner peripheral surface of the encoder 2 is rendered to have a sectional shape in which a portion of the circle is caused to project in an inner diametric side at the flat surface area 2a. Accordingly, the encoder 2 can be assembled by inserting from an axial direction relative to the shaft 21 and, with the flat surface area 2a of the encoder 2 engaged with the cutout 21a of the shaft 21, the encoder 2 is non-rotatably fitted to the shaft 21.

The sensor unit 3 referred to previously is operable to detect a change in magnetism incident to rotation of the magnetic body in the encoder 2 and then to output a rotation signal. As shown in an exploded perspective view of the rotation sensor equipped bearing assembly in FIG. 4, the sensor unit 3 includes, a sensor mounting substrate 7 of a generally square shape in a plane representation, a sensor 8 and a wiring connector 9 both fixed on one surface of the sensor mounting substrate 7. The sensor mounting substrate 7 is a printed circuit substrate. In addition to the sensor 8 and the wiring connector 9, the sensor mounting substrate 7 has an electronic component part (not shown) which will form a signal processing circuit or the like that is connected with the sensor 8. The sensor mounting substrate 7 is installed in a connectable fashion from the other end portion (left end portion shown in FIG. 1) of the sensor housing 4 referred to above. The sensor 8, the wiring connector 9 and the electronic component part are arranged having been juxtaposed in a direction which forms a chord of the circular section of an outer peripheral surface of the sensor hosing 4. The sensor 8 is in the form of a magnetic sensor such as, for example, a Hall element. Through the wiring connector 9, supply of an electric power from the outside and outputting of the rotation signal detected take place.

Figure 4:
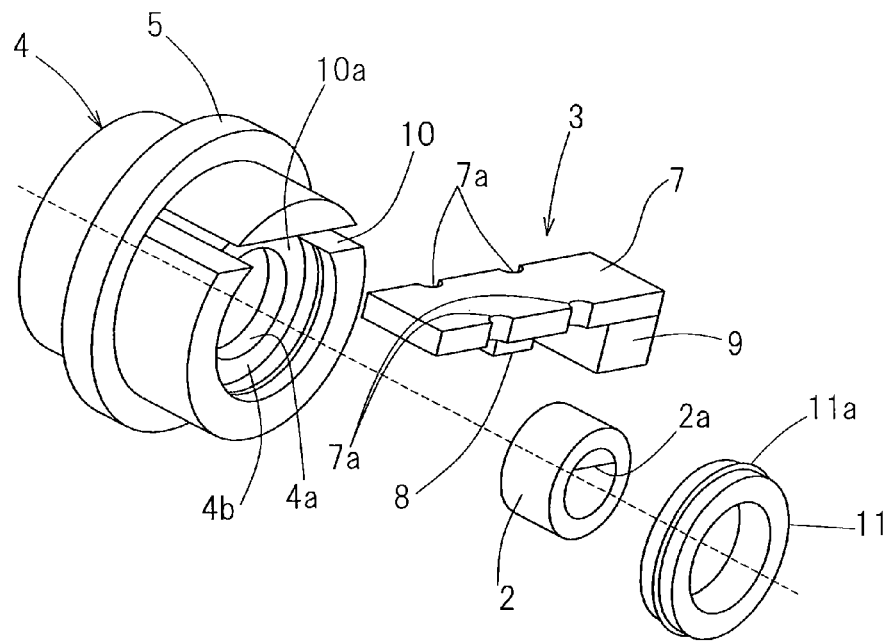
FIG. 4 is an exploded perspective view of the rotation sensor equipped bearing assembly.

A half portion of the sensor housing 4 on the side opposite to the site of installation of the bearing unit 20 is provided with an axially extending substrate mounting groove 10 as shown in FIG. 4. This substrate mounting groove 10 is in the form of an axially extending slit formed so as to spread in a direction, which is to define a chord of the circular sectional shape of the outer peripheral surface of the sensor housing 4, and opens towards one end face of the sensor housing 4 with its opposite side edges opening at the outer periphery of the sensor housing 4. With the sensor mounting substrate 7 for the sensor unit 3 engaged in this substrate mounting groove 10, the sensor unit 3 is mounted on the sensor housing 4. Mounting of the sensor mounting substrate 7 onto the substrate mounting groove 10 is carried out in such a manner that the sensor 8 mounted on that one side surface of the sensor mounting substrate 7 may face the encoder 2 in a radial direction. The substrate mounting groove 10 referred to above has a groove inner wall surface on the side adjacent the shaft insertion hole 4a in the sensor housing 4, which groove inner wall surface is located at a position which is to define a chord of the encoder accommodating space 4b comprised of a cylindrical surface, and is communicated at an intermediate portion in a widthwise direction with the encoder accommodating space 4b which is a large diametric portion of the shaft insertion hole 4a. This communicating portion becomes an encoder confronting port 10a. A predetermined gap is set between the sensor 8 and the encoder 2.

The wiring connector 9 for the sensor unit 3 is, as best shown in a left side view in FIG. 3B, provided in one end portion of the sensor mounting substrate 7, which protrudes in a direction laterally outwardly of the sensor housing 4 from the substrate mounting groove 10 in a fashion with the sensor mounting substrate 7 having been engaged in the substrate mounting groove 10 in the sensor housing 4. Also, as best shown in a top plan view in FIG. 5, the sensor mounting substrate 7 is so rendered as to be engageable in the substrate mounting groove 10, even though a position of protrusion of a connector installing side end portion from the substrate mounting groove 10 is reversed left and right to that shown in a top plan view in FIG. 2B. Further, a fixing position of the sensor 8 to the sensor mounting substrate 7 is so set that even when the substrate mounting groove 10 is reversed in position the position of the sensor 8 relative to the encoder 2 can assume the same position before such reversion.

Also, on the side of one end of the sensor housing 4 where the substrate mounting groove 10 is provided as hereinabove described, there is provided an annular lid member 11 for closing a space delimited between the inner peripheral surface of the sensor housing 4 and the encoder 2, which lid member 11 is insertable from the axial direction. As best shown in FIG. 4, the lid member 11 has an annular engagement projection 11a defined at a location intermediate of the widthwise direction of an outer periphery and, an annular engagement recess 12 is provided in one end of the inner peripheral surface of the sensor housing as best shown in FIG. 1. When the annular engagement projection 11a is engaged in the annular engagement recess 12, the lid member 11 can be constrained in position relative to the sensor housing 4. The lid member 11 in this case concurrently serves as an axially detachment preventing member for avoiding detachment of the encoder 2 and the sensor unit 3 in the axial direction. The lid member 11 has an inner diametric dimension so set as to enable the flat surface area 2a in the inner periphery of the encoder 2 to be viewable from the outside of the lid member 11. Accordingly, a work to insert the shaft 21 into the rotation sensor equipped bearing assembly can be easily accomplished.

Figure 2B:
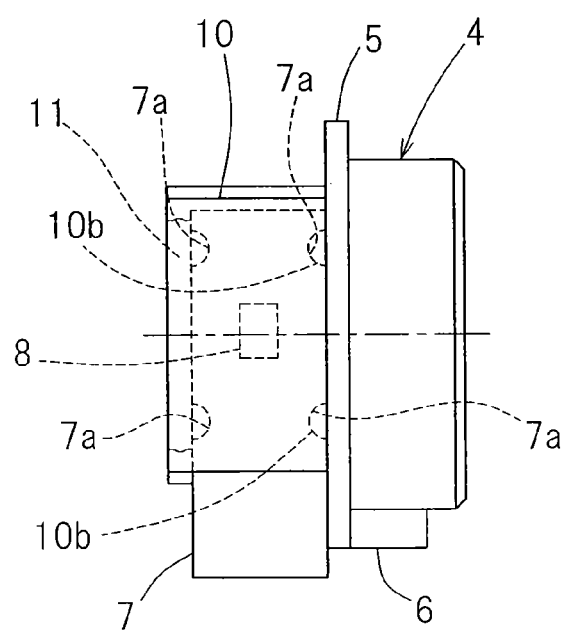
FIG. 2B is a top plan view of the rotation sensor equipped bearing assembly.

As shown in FIG. 2B, axially oriented opposite end faces of the sensor mounting substrate 7 of the sensor unit 3 are provided respectively with a pair of recesses 7a and 7a in a laterally oriented fashion for preventing lateral detachment of the sensor housing 4 from the substrate mounting groove 10. The pair of the recesses 7a and 7a in those opposite end faces are disposed at the same positions with each other. Also, a bottom surface of the substrate mounting groove 10, which confronts the end faces of the sensor mounting substrate 7, is provided with a pair of projections 10b and 10b engageable respectively in the recesses 7a in the sensor mounting substrate 7. When with the sensor mounting substrate 7 engaged in the substrate mounting groove 10 the recesses 7a in the sensor mounting substrate 7 are engaged with the respective projections 10b in the substrate mounting groove 10, a scheme to prevent the sensor mounting substrate 7 from detaching laterally of the substrate mounting groove 10 can be embodied. It is, however, to be noted that the recesses 7a in the sensor mounting substrate 7 may be replaced with projections and, at the same time, the projections 10b in the substrate mounting groove 10 may be replaced with recesses.

Figure 5:
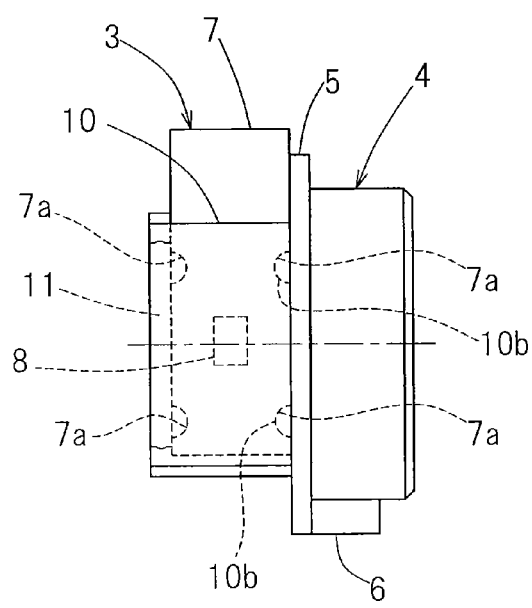
FIG. 5 is a top plan view of the rotation sensor equipped bearing assembly, showing a sensor mounting substrate for a sensor unit in the bearing assembly having been fitted in a reversed condition.

The pair of the projections 10b and 10b in the substrate mounting groove 10 are, as best shown in FIG. 2B, provided at respective positions symmetrical to each other with respect to the longitudinal axis of the sensor housing 4. Also, the position of the sensor 8 that is fixed to the sensor mounting substrate 7 is chosen to be an axially intermediate position of the sensor mounting substrate 7 and, at the same time, a position intermediate between a pair of recesses 7a in a direction of juxtaposition of the pair of the recesses 7a and 7a referred to above. Accordingly, as best shown in FIG. 2B, even in a condition of the sensor mounting substrate 7 in which the wiring connector 9 is positioned on one side of the sensor housing 4 and, as shown in FIG. 5, in a reversed condition of the sensor mounting substrate 7 in which the wiring connector 9 is positioned on the other side of the sensor mounting substrate 7, it is possible to cause the sensor 8 to face the encoder 2 at the same position.

When as shown in FIG. 1, a snap ring 13 in the form of, for example, an E-ring is engaged in a snap ring mounting groove 21b, which is provided in an outer peripheral portion of the shaft 21 held at an axial position on one side of the encoder 2 opposite to the lid member 11, after the lid member 11 has been assembled into an end face opening in the sensor housing 4, the rotation sensor equipped bearing assembly can be axially positioned in a fashion having been sandwiched between the housing 40 of the equipment and the snap ring 13.

According to the rotation sensor equipped bearing assembly of the structure hereinabove described, when the encoder 2 rotates integrally together with the shaft 21, the sensor 8 of the sensor unit 3 provided in the sensor housing 4 detects a change in magnetism of the encoder 2 and, accordingly, the rotation of the shaft 21 can be detected from this detection signal.

As hereinabove described, according to the rotation sensor equipped bearing assembly of the structure hereinabove described, since a rotation sensor 1 is constituted by the encoder 2 and the sensor unit 3 and the bearing unit 20 is provided in the inner peripheral portion of the sensor housing 4 in which the sensor unit 3 is installed, the rotation sensor 1 can be easily assembled into the sensor housing 4 even though the bearing unit 20 is in the form of a sliding bearing unit. In particular, the sensor unit 3 includes the sensor mounting substrate 7 and the sensor 8, fixed to the sensor mounting substrate 7, and the sensor mounting substrate 7 is made insertable from the other end portion of the sensor mounting substrate 7. More specifically, the sensor housing 4 is provided with the substrate mounting groove 10, that extends axially while spreading in the direction which will become the chord of the circular shaped section of the outer peripheral surface thereof, and the sensor unit 3 is installed in the sensor housing 4 with the sensor mounting substrate 7 engaged in the substrate mounting groove 10. Therefore, the assemblage is each to accomplish and the axial length as well can be reduced.

Also, even when the shaft diameter and/or the shape of the shaft change, the common sensor mounting substrate 7 can be used, and therefore, the number of component parts to be changed can be minimized. In other words, if the shaft diameter and/or the shape of the shaft change, the sensor housing 4 is changed so as to accommodate it. At this time, the sensor housing 4 is so designed as to permit the sensor 8 to receive a magnetic force equal to that before the change in shape. In addition, the design is so made that the dimension of a sensor substrate fitting portion may be identical with that before the change in shape to allow the sensor mounting substrate 7 to be accommodated therein. By so doing, the same sensor sensitivity, circuit construction and sensor mounting substrate 7 as those before the change in shape can be used and the sensor mounting substrate 7 can be used in common in any of other rotation sensor equipped bearing assemblies of a similar structure.

Also, since in the above described first embodiment, the use is made of the lid member 11 for enclosing the space delimited between the inner peripheral surface of the sensor housing 4 and the encoder 2 and is concurrently used as a detachment preventing member for avoiding detachment of the encoder 2 and the sensor unit 3 in the axial direction, the assemblage can be accomplishes further easily and the number of component parts can be reduced. Yet, since the lid member 11 and the encoder 2 are made insertable from the axial direction, the assemblage can be accomplished yet further easily.

In the foregoing embodiment, the sensor unit 3 has the wiring connector 9 at a portion of the sensor mounting substrate 7 that protrudes laterally outwardly from the substrate mounting groove 10 in the sensor housing 4, so that even when the position of protrusion of the wiring connector 9 from the substrate mounting groove 10 is reversed in position the sensor mounting substrate 7 can be insertable into the substrate mounting groove 10 and the position at which the sensor 8 of the sensor unit 3 is fixed to the sensor mounting substrate 7 can remain the same position as that before the reversion in position of the sensor 8 relative to the encoder 2. Accordingly, either one of two alternative ways of assembling the sensor mounting substrate 7 onto the sensor housing 4 can be employed, thus facilitating the assemblage.

Moreover, since in this first embodiment described hereinabove, the recesses 7a (alternatively, projections) for preventing detachment of the sensor housing 4 in a direction laterally outwardly from the substrate mounting groove 10 are provided in the end face of the sensor mounting substrate 7 that is oriented axially and, at the same time, the projections 10b (alternatively, recesses) engageable with the recesses 7a are provided in the bottom surface of the substrate mounting groove 10 which confronts the end face of the sensor mounting substrate 7. Accordingly, positioning of the sensor mounting substrate 7 leftwards or rightwards relative to the sensor housing 4 can be eased.

Figure 6A:
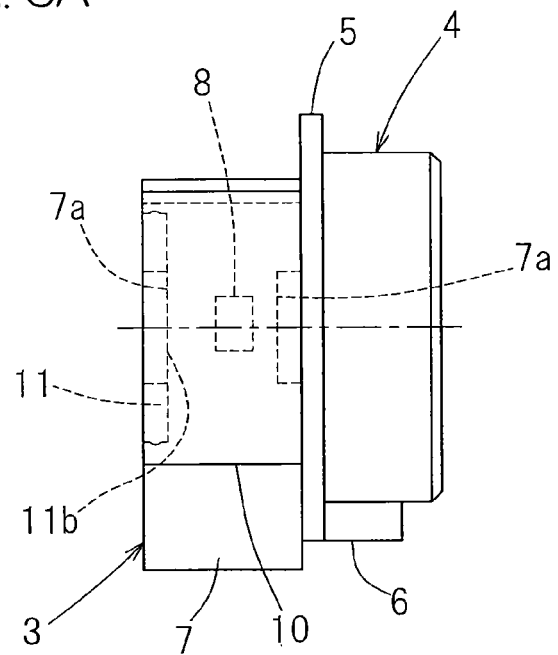
FIG. 6A is a top plan view of the rotation sensor equipped bearing assembly designed in accordance with a second preferred embodiment of the present invention.
Figure 6B:
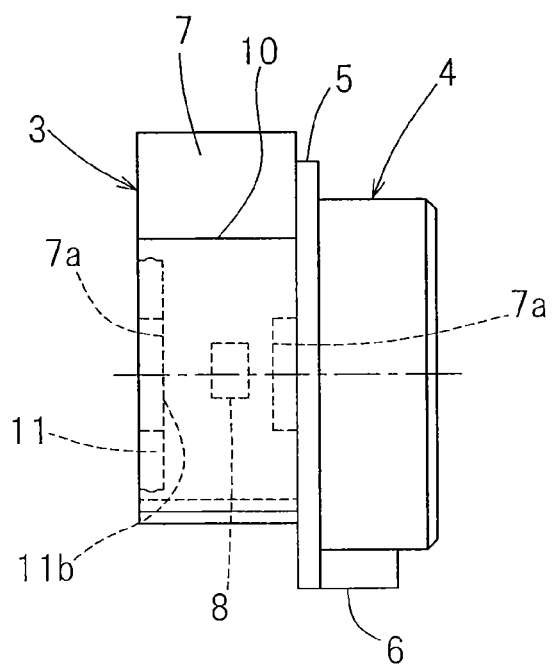
FIG. 6B is a top plan view the rotation sensor equipped bearing assembly, showing the sensor mounting substrate for the sensor unit in the bearing assembly having been fitted in a reversed condition.

FIGS. 6A and 6B illustrate a second preferred embodiment of the present invention. The rotation sensor equipped bearing assembly designed in accordance with this second embodiment is similar to that shown in and described with reference to FIGS. 1 to 5 in connection with the first embodiment, but differs therefrom in that, instead of the provision of the projections 10b in the bottom surface of the substrate mounting groove 10, a single projection 11b is provided in the lid member 11 so that the recess 7a in the sensor mounting substrate 7 can be engaged with this projection 11b to thereby accomplish the positioning of the sensor mounting substrate 7 leftwards or rightwards relative to the sensor housing 4. In this instance, the recess 7a at the opposite end faces of the sensor mounting substrate 7 that are oriented axially is provided one at a position aligned with the longitudinal axis of the sensor housing 4. It is, however, to be noted that in place of the recess 7a in the sensor mounting substrate 7, a projection may be employed, in which case the projection 11b in the lid member 11 has to be replaced with the recess.

In FIG. 6A, there is shown a top plan view showing the sensor mounting substrate 7 engaged in the substrate mounting groove 10 in a fashion, in which one side portion of the sensor mounting substrate 7 to which the wiring connector 9 (not shown) is fixed protrudes laterally rightwards of the substrate mounting groove 10 in the sensor housing 4. FIG. 6B illustrates a similarly top plan view showing the sensor mounting substrate 7 engaged in the substrate mounting groove 10 in a reversed fashion in which that side portion of the sensor mounting substrate 7, to which the wiring connector 9 (not shown) is fixed, protrudes laterally leftwards of the substrate mounting groove 10 in the sensor housing 4. Other structural features thereof are similar to those employed in the first embodiment shown in and described with reference to FIGS. 1 to 5.

Even in the case of this second embodiment, positioning of the sensor mounting substrate 7 leftwards or rightwards relative to the sensor housing 4 can be accomplished. It is to be noted that as measures for positioning the sensor mounting substrate 7, instead of the use of the recess 7a in the sensor mounting substrate 7 or the projection 10b on the bottom surface of the substrate mounting groove 10 employed in the practice of the first embodiment shown in and described with reference to FIGS. 1 to 5 or the projection 11b in the lid member 11 employed in the practice of this second embodiment, the sensor mounting substrate 7 engaged in the substrate mounting groove 10 may be directly fixed to the sensor housing 4 by means of bonding.

Figure 7:
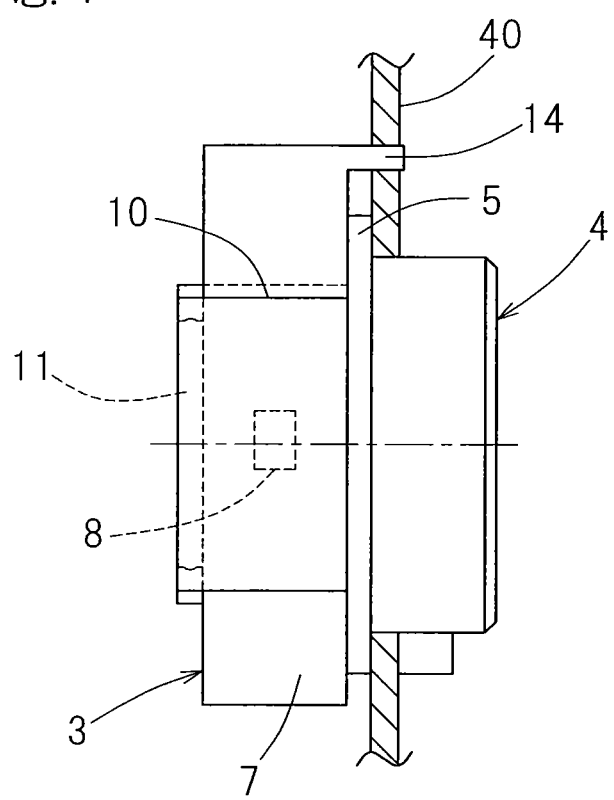
FIG. 7 is a top plan view of the rotation sensor equipped bearing assembly designed in accordance with a third preferred embodiment of the present invention.

FIG. 7 illustrates a third preferred embodiment of the present invention. The rotation sensor equipped bearing assembly designed in accordance with this third embodiment is similar to that shown in and described with reference to FIGS. 1 to 5 in connection with the first embodiment, but differs therefrom in that the sensor mounting substrate 7 is made to have an increased length so that, in a condition in which the sensor mounting substrate 7 is engaged in the substrate mounting groove 10 in the sensor housing 4, the opposite side portion of the sensor mounting substrate 7, which is opposite to the side portion thereof to which the wiring connector 9 (not shown) is fixed, may be also made to protrude from the substrate mounting groove 10 and the engagement projection 14 engageable with the housing 40 of the equipment is provided in that opposite side portion of the sensor mounting substrate 7. The recess 7a provided in the axially oriented opposite end faces of the sensor mounting substrate 7 and the projection 10b provided in the bottom surface of the substrate mounting groove 10 are dispensed with. Other structural features thereof are similar to those shown in and described with reference to FIGS. 1 to 5 in connection of the first embodiment. Even in this case, thanks to the engagement of the sensor mounting substrate 7 with the housing 40 of the equipment by way of the engagement projection 14, positioning of the sensor mounting substrate 7 leftwards or rightwards relative to the sensor housing 4 can be enabled. It is, however, to be noted that in this case the sensor mounting substrate 7 cannot be engaged with the substrate mounting groove 10 in the sensor housing 4 in the leftwards or rightwards reversed fashion.

Figure 8A:
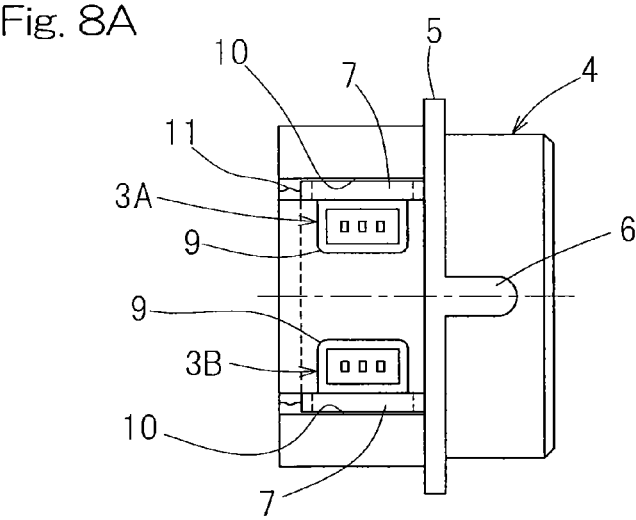
FIG. 8A is a front elevational view of the rotation sensor equipped bearing assembly designed in accordance with a fourth preferred embodiment of the present invention.
Figure 8B:
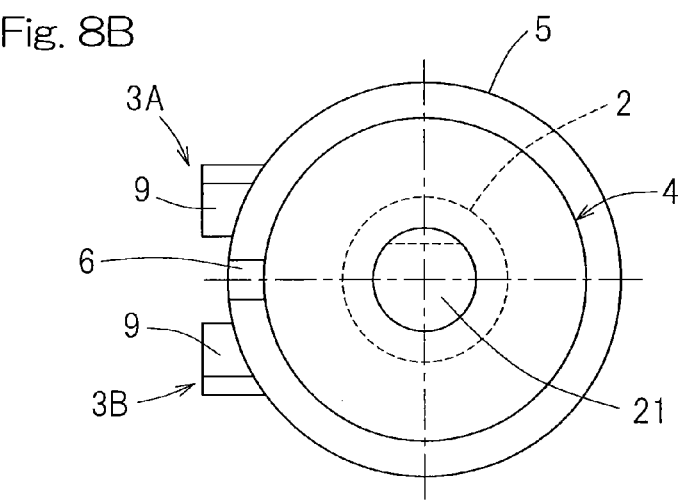
FIG. 8B is a right side view of the rotation sensor equipped bearing assembly.
Figure 8C:
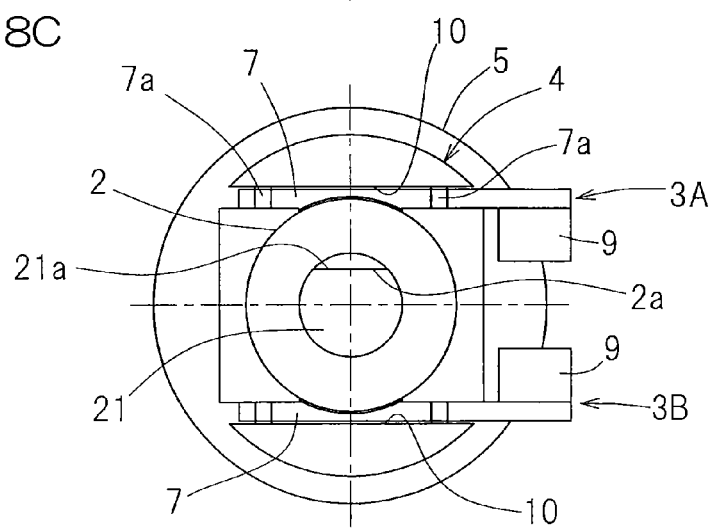
FIG. 8C is a left side view of the rotation sensor equipped bearing assembly.

FIGS. 8A to 8C illustrate a fourth preferred embodiment of the present invention. The rotation sensor equipped bearing assembly designed in accordance with this fourth embodiment is similar to that shown in and described with reference to FIGS. 1 to 5 in connection with the first embodiment, but differs therefrom in that the substrate mounting groove 10 in the sensor housing 4 is provided in two in number at different positions in a direction circumferentially of the sensor housing 4 so that, with the two sensor mounting substrate 7 of the type referred to above having been engaged in those two substrate mounting grooves 10, two sensor units 3A and 3B can be positioned on the sensor housing 4. The two substrate mounting grooves 10 are, in this instance, held at respective positions spaced 180° from each other and arranged in parallel relation to each other. The respective structures of the sensor units 3A and 3B are similar to that employed in the practice of the first embodiment shown in and described with reference to FIGS. 1 to 5. Where two sensor units 3A and 3B are employed in this way, the direction of rotation of the shaft 21 can also be detected from the phase difference between respective detection signals of those sensor units 3A and 3B.

Figure 9:
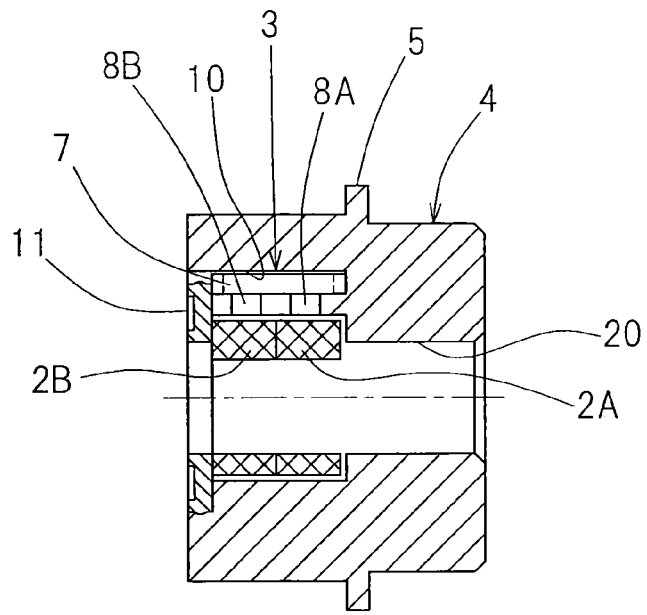
FIG. 9 is a longitudinal sectional view of the rotation sensor equipped bearing assembly designed in accordance with a fifth preferred embodiment of the present invention.

FIG. 9 illustrates a fifth preferred embodiment of the present invention. The rotation sensor equipped bearing assembly designed in accordance with this fifth embodiment is similar to that shown in and described with reference to FIGS. 1 to 5 in connection with the first embodiment, but differs therefrom in that at two axially juxtaposed positions of the sensor mounting substrate 7 a rotation detecting sensor 8A and a point of origin detecting sensor 8B are fixed and, at the same time, as the encoder 2 referred to above, a rotation detecting encoder 2A that is detected by the rotation detecting sensor 8A and a point of origin detecting encoder 2B that is detected by the point of origin detecting sensor 8B are axially juxtaposed. Other structural features thereof are similar to those employed in the first embodiment shown in and described with reference to FIGS. 1 to 5.

As hereinabove described, when the use is made of the rotation detecting sensor 8A and the point of origin detecting sensor 8B and the corresponding use of the rotation detecting encoder 2A and the point of origin detecting encoder B that are detected respectively by those sensors is made, not only the detection of the rotation of the shaft 21, but also the detection of the point of origin become possible.

Figure 10:
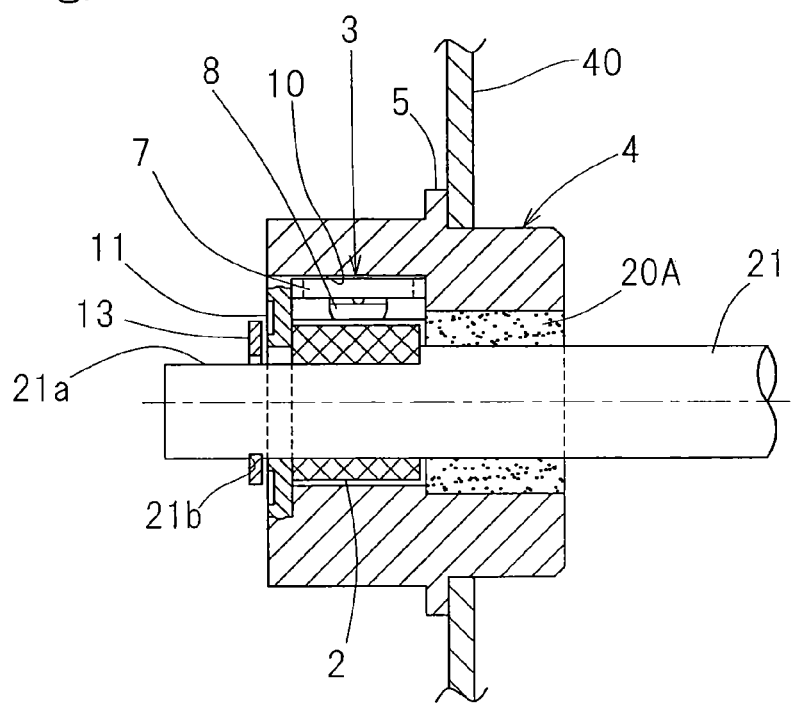
FIG. 10 is a longitudinal sectional view of the rotation sensor equipped bearing assembly designed in accordance with a sixth preferred embodiment of the present invention.

FIG. 10 illustrates a sixth preferred embodiment of the present invention. The rotation sensor equipped bearing assembly designed in accordance with this sixth embodiment is similar to that shown and described with reference to FIGS. 1 to 5 in connection with the first embodiment, but differs therefrom in that the bearing unit provided in the inner peripheral portion of the sensor housing 4 is in the form of a separate slide bearing unit 20A mounted on the inner peripheral surface of the sensor housing 4 in place of the sliding bearing unit 20 constituted by the inner peripheral portion of the sensor housing 4. In this instance, the sliding bearing unit 20A is comprised of an oil retaining bearing unit. Other structural features thereof are similar to that employed in the practice of the previously described first embodiment.

Figure 11:
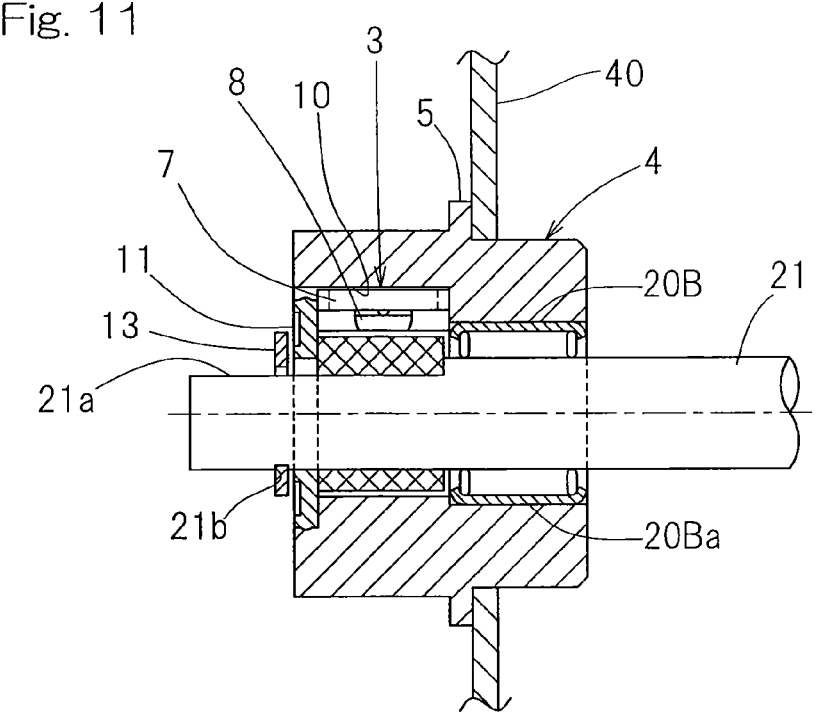
FIG. 11 is a longitudinal sectional view of the rotation sensor equipped bearing assembly designed in accordance with a seventh preferred embodiment of the present invention.

FIG. 11 illustrates a seventh preferred embodiment of the present invention. The rotation sensor equipped bearing assembly designed in accordance with this seventh embodiment is similar to that shown in and described with reference to FIGS. 1 to 5 in connection with the first embodiment, but differs therefrom in that the bearing unit provided in the inner peripheral portion of the sensor housing 4 is in the form of a needle bearing unit 20B, fitted to the inner peripheral surface of the sensor housing 4, in place of the sliding bearing unit 20 constituted by the inner peripheral surface of the sensor housing 4. This needle bearing unit 20B includes a shell type outer ring 20Ba having a collar at opposite ends thereof and a plurality of needle roller. Other structural features thereof are similar to that employed in the practice of the previously described first embodiment.

Figure 12:
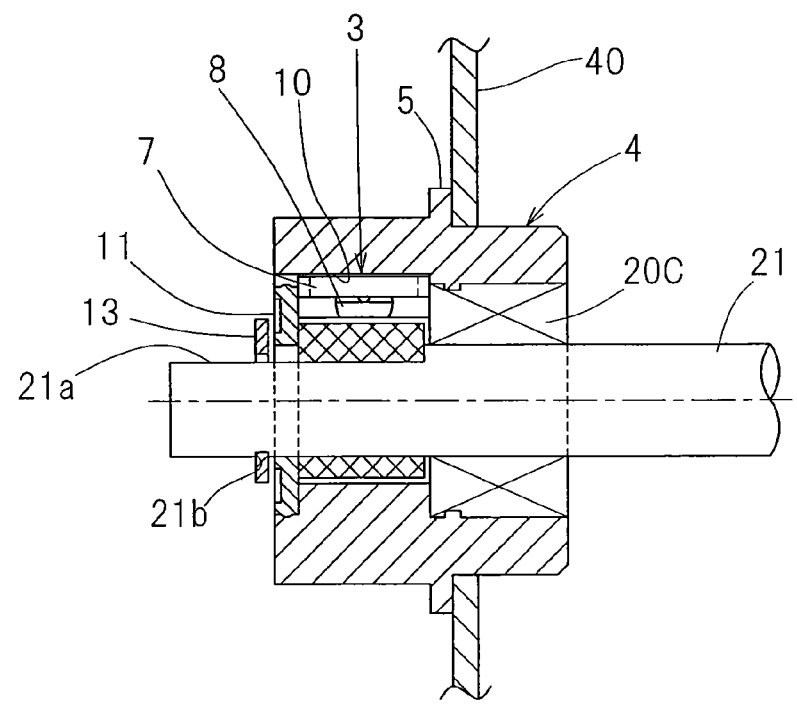
FIG. 12 is a longitudinal sectional view of the rotation sensor equipped bearing assembly designed in accordance with an eighth preferred embodiment of the present invention.

FIG. 12 illustrates an eighth preferred embodiment of the present invention. The rotation sensor equipped bearing assembly designed in accordance with this eighth embodiment is similar to that shown in and described with reference to FIGS. 1 to 5 in connection with the first embodiment, but differs therefrom in that the bearing unit provided in the inner peripheral portion of the sensor housing 4 is in the form of a rolling bearing unit 20C, fitted to the inner peripheral surface of the sensor housing 4, in place of the sliding bearing unit 20 constituted by the inner peripheral surface of the sensor housing 4. This rolling bearing unit 20C is rendered to be a ball bearing unit such as, for example, a deep substrate mounting groove ball bearing or the like. Other structural features thereof are similar to that employed in the practice of the previously described first embodiment. Even where the rolling bearing unit 20C is fitted to the inner peripheral surface of the sensor housing 4 in this way, a bearing unit of a standard shape can be incorporated and a further reduction of costs can be accomplished.

A ninth preferred embodiment of the present invention will now be described with particular reference to FIG. 13 to FIGS. 19A and 19B. In those figures, component parts similar to or identical with those employed in the first embodiment shown in and described with reference to FIGS. 1 to 5 are designated by like reference numerals and, therefore, the details thereof are not reiterated for the sake of brevity.

Figure 13:
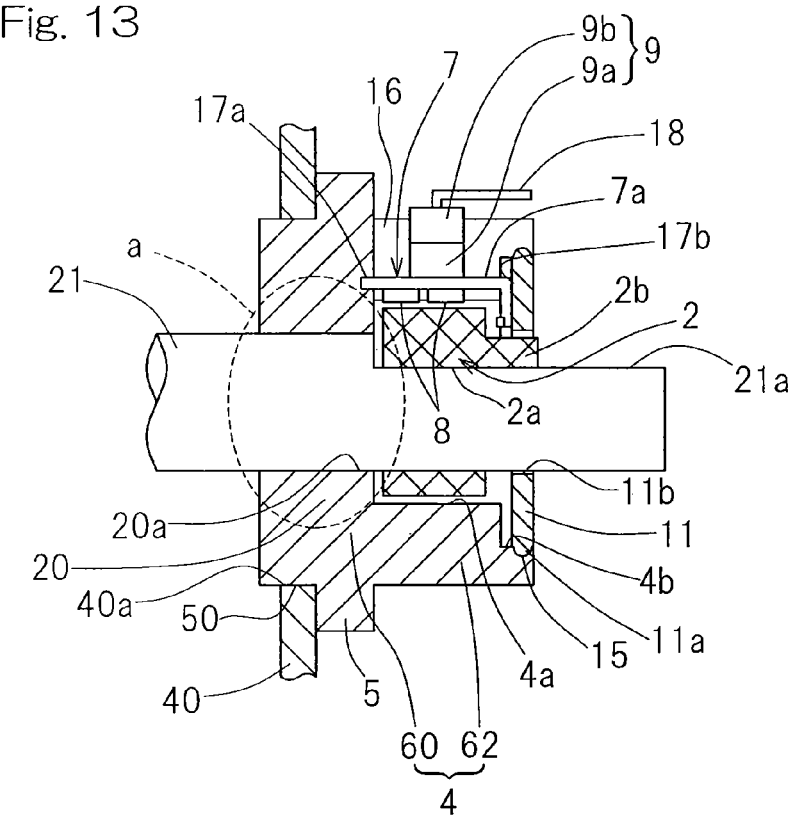
FIG. 13 is a longitudinal sectional view of the rotation sensor equipped bearing assembly designed in accordance with a ninth preferred embodiment of the present invention.
Figure 14:
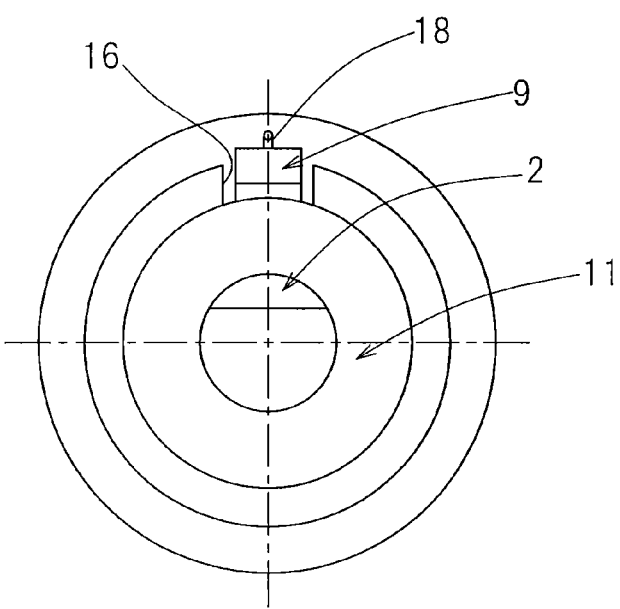
FIG. 14 is a rear view of the rotation sensor equipped bearing assembly.

The sensor housing 4 employed in this rotation sensor equipped bearing assembly in the practice of the ninth embodiment includes an integral component comprised of a bearing unit 60, provided at a first end portion (left end portion as viewed in FIG. 13) of such sensor housing 4, and an annular housing portion 62 provided adjacent to the second end portion (right end portion as viewed in FIG. 13) opposite to the first end portion for enclosing the outer periphery of the shaft 21, with the bearing unit 60 and the housing portion 62 being provided integrally with each other and juxtaposed relative to each other in the axial direction. The sensor unit 4 may be made of either a metallic material or a resinous material. The bearing unit 60 includes the bearing unit 20 having an inner peripheral surface 20a of a cylindrical surface shape held in contact with the shaft 21. Although so far shown in FIG. 13 the entirety is rendered to be an integral component of the same material, in a portion that defines the inner peripheral surface 20a of the bearing unit 20, which undergoes a sliding contact with the shaft 21, a raw material having a higher wear resistance than that used in the remaining portion may be employed. By so doing, the bearing unit 20 can have an extended service life. In this case, a portion forming the inner peripheral surface 20a is constituted by, for example, a sleeve and is fixed to the remaining portion by means of welding, press-fitting, bonding, molding or the like. It is to be noted that a region "a" shown by the broken line in FIG. 13 represents a portion which function as a sliding bearing for the bearing unit 20 and the shaft 21.

Figure 19A:
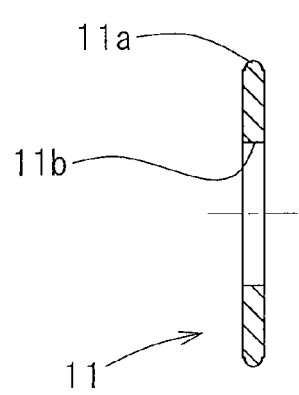
FIG. 19A is a sectional view of a lid member used in the rotation sensor equipped bearing assembly.
Figure 19B:
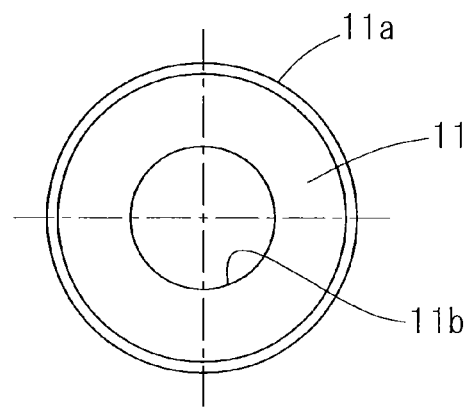
FIG. 19B is a front elevational view of the lid member.

The housing portion 62 is rendered to be a cylindrical portion in which an outer diameter thereof is equal to that of the bearing unit 60 and an inner diameter thereof is larger than that of the bearing unit 60. An inner peripheral surface of the housing portion 62 is a stepped cylindrical surface such that the inner periphery of the second end of the bearing unit 60 relative to the bearing unit 60 represents an inner diameter expanded portion 4b of a greater diameter than the inner peripheral surface 4a of the other portion. The inner diameter expanded portion 4b is formed with a lid fitting groove 15 in the form of a circumferential groove, and the lid member 11 in the form of a plate as shown in FIGS. 19A and 19B is mounted on this groove 15 with an annular engagement projection 11a in the outer periphery. The lid member 11 is formed to represent an annular shape having a shaft insertion portion 11b at a center thereof.

Figure 15A:
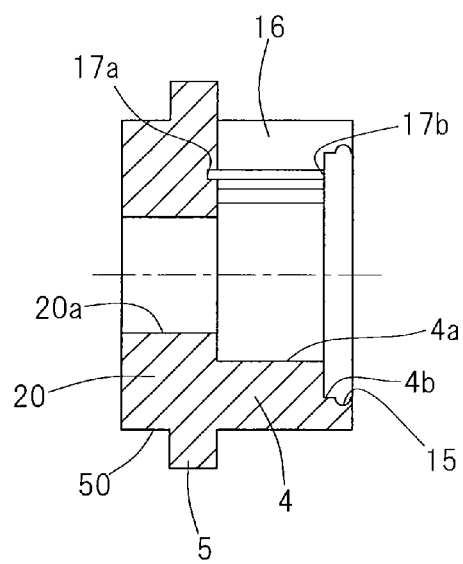
FIG. 15A is a side view, with a portion cut out, showing a sensor housing employed in the rotation sensor equipped bearing assembly.
Figure 15B:
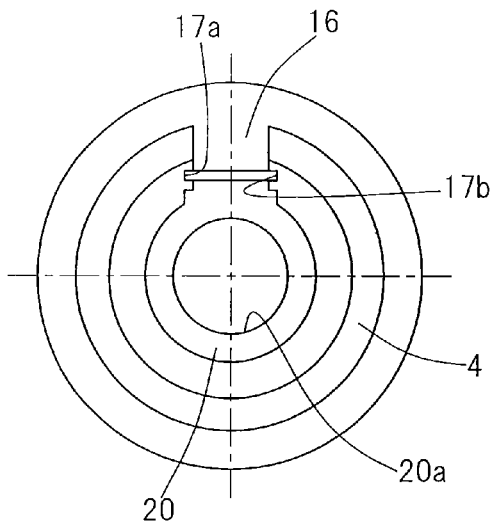
FIG. 15B is a rear view of the sensor housing.

A circumferential portion of the housing portion 62 is provided with a substrate installation window 16 that extends radially inside to radially outside, and vice versa. As shown in FIGS. 15A and 15B, the substrate installation window 16 has an inner peripheral surface provided with a first groove-like substrate receiving portion 17a, which is a recess positioned at one axial end thereof, and a second groove-like substrate receiving portion 17b, which is a recess positioned on circumferentially spaced opposite sides, in continuation with each other. As best shown in FIG. 13, the sensor mounting substrate 7, when three sides of the outer periphery thereof are engaged in those first and second groove-like substrate receiving portions 17a and 17b, is only axially removably received by the first and second substrate receiving portions 17a and 17b. The sensor mounting substrate 7 so axially removably received by the first and second substrate receiving portions 17a and 17b is, when the lid member 11 is engaged with the housing portion 62, retained in position by the lid member 11 without being detached and is hence held in a fixed condition relative to the housing portion 62. It is to be noted that each of the first and second substrate receiving portions 17a and 17b may be a projection protruding into the substrate installation window 16.

Figure 18:
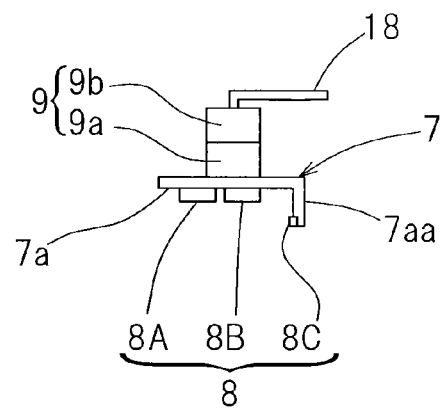
FIG. 18 is a side view of the sensor mounting substrate employed in the rotation sensor equipped bearing assembly.

As shown in FIG. 18, the sensor mounting substrate 7 is of a type in which the sensor 8 and circuit component parts (not shown) are mounted on a rectangular printed circuit substrate 7a. In the instance now under discussion, the printed circuit substrate 7a has its opposite surfaces provided with respective wiring patterns (not shown) with those wiring patterns connected with each other through conductors in throughholes, and the wiring connector 9 is mounted on one of the opposite surfaces thereof opposite to the surface on which the sensor 8 (8A, 8B, 8C) is mounted. The wiring connector 9 includes connector component parts 9a and 9b on socket and plug sides that are connected with each other in a plug-in fashion, and the connector component part 9a on the socket side is mounted on the printed circuit substrate 7a. The connector component part 9b on the plug side is connected with a wiring 18.

The sensor mounting substrate 7 has mounted thereon first and second rotation detecting sensors 8A and 8B and a point of origin detecting sensor 8C as the sensor 8. It is to be noted that in the specification as herein set forth, unless otherwise specified, those three sensors 8A to 8C are collectively referred to as the sensor 8. The first and second sensors 8A and 8B for the detection of rotation are disposed in a fashion juxtaposed in the axial direction. The sensor 8C for the detection of the point of origin is provided on a bent piece 7aa formed at one end of the printed circuit board 7a, which is bent to represent am L-shaped configuration. For each of the rotation detecting sensors 8A and 8B, a bipolar detecting type sensor (a sensor capable of detecting N and S poles) or a monopole detecting sensor (a sensor capable of detecting only N poles or S poles) is employed. For the point of origin detecting sensor 8C, a monopole detecting sensor is employed.

Figure 16A:
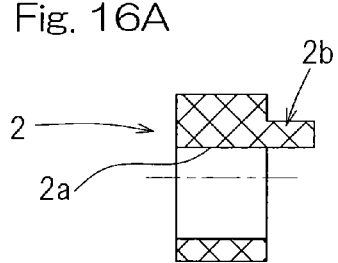
FIG. 16A is a side view, with a portion cut out, showing an encoder employed in the rotation sensor equipped bearing assembly.
Figure 16B:
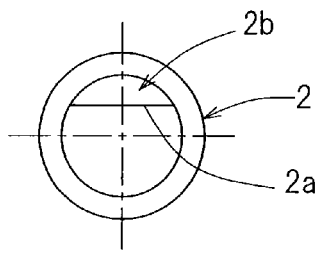
FIG. 16B is a rear view of the encoder.

The encoder 2 referred to above is shown in FIGS. 16A and 16B. Even this encoder 2 is similar to that described as employed in the practice of the first embodiment and, therefore, the details thereof are not reiterated for the sake of brevity, but the encoder 2 is mounted on the outer periphery of the shaft 21 as shown in FIG. 13. This encoder 2 has a circumferential portion of the inner periphery thereof provided with the flat surface area 2a, having a tip end representing a flat surface, so as to protrude therefrom for inhibiting the rotation, and the flat surface area 2a engages with the cutout 21a that is rendered to be a flat surface of the shaft 21 so that the entirety thereof is held in contact with such a cutout 21a as best shown in FIG. 13.

Figure 17:
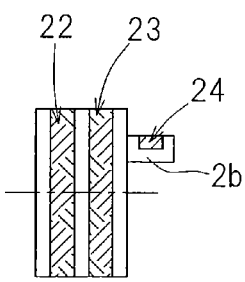
FIG. 17 is an explanatory diagram used to explain the region of the encoder that is magnetized.

The encoder 2 referred to above is such that as shown in FIG. 17, annular rotation detecting magnetized tracks 22 and 23 are provided on an outer periphery in an axially juxtaposed fashion. The first rotation detecting magnetized track 22 is of a type having magnetic poles such as, for example, N and S poles provided alternately at an equal pitch in a direction circumferentially thereof. The second rotation detecting magnetized track 23 is of a type having magnetic poles of N and S polarities provided alternately in the circumferential direction as is the case with the first rotation detecting magnetized track 22, but is rendered to be in a phase or pitch different from that of the first rotation detecting magnetized track 22. By way of example, only the magnetic poles in one portion in the circumferential direction may be rendered to be magnetic poles having a large circumferential width, in which case the remaining magnetic poles in the remaining portion are rendered to be at an equal pitch.

One end of a cylindrical portion of the encoder 2 is provided with a projected piece 2b projecting axially from the flat surface area 2a referred to above. This projected piece 2b has the same transverse sectional shape as that of the flat surface area 2a in which an outer peripheral surface is a cylindrical surface and an inner peripheral surface is a flat surface, and is engageable in the shaft insertion portion 11b of the lid member 11, shown in FIG. 13, with a gap left therebetween for tolerating a relative rotation. A surface of the projected piece 2b on an encoder outer diametric side is provided with a point of origin detecting magnetized track 24 as shown in FIG. 17. The point of origin detecting magnetized track 24 is a point of origin detecting magnetized portion as hereinbefore described and has a single magnetic pole of N or S polarity. With the point of origin detecting magnetized track 24 so provided on the projected piece 2b, there is no need to provide the point of origin detecting magnetized track 24 on the cylindrical portion of the encoder 2 and, hence, the encoder 2 can be downsized. It is to be noted that the point of origin detecting magnetized track 24 may be of a type in which the N and S poles are arranged in three in number alternately in the circumferential direction.

It is to be noted that each of the sensors 8A to 8C is disposed at a respective axial position that is the same as that of the two rotation detecting magnetized tracks 22 and 23 and the point of origin detecting track 24 of the encoder 2 and is held in face to face relation with those magnetized tracks 22 to 24 in the radial direction.

According to the rotation sensor equipped bearing assembly of the structure designed in accordance with the above described ninth embodiment, the sensor mounting substrate 7 is mounted removably from the second end portion of the housing portion 62 relative to the housing portion 62 that is integrated with the bearing unit 60 including the bearing unit 20. For this reason, separation of the bearing portion 60 from the sensor mounting substrate 7, and vice versa, can be easily accomplished. Accordingly, in the event of failure of either one of the bearing portion 60 and the sensor mounting substrate 7, only the failing component part can be replaced and the remaining component parts can then be reused.

Also, since the sensor mounting substrate 7 is disposed within the substrate installation window 16 while having been received by the substrate receiving portions 17a and 17b and is fixed in position by the lid member 11 without being allowed to be detached therefrom, selective mounting and detachment of the sensor mounting substrate 7 relative to the bearing portion 60 can be eased. The wiring 18 connected with the sensor mounting substrate 7 is drawn outwardly from the substrate installation window 16 towards an outer diametric side, removal or installation of the sensor mounting substrate 7 can be accomplished without the wiring 18 constituting any obstruction. In particular, where the wiring connector 9 is provided in the sensor mounting substrate 7, the removal or installation of the sensor mounting substrate 7 can be accomplished in a condition with the wiring 18 not connected, and therefore, handling of the rotation sensor equipped bearing assembly within a bearing machine such as, for example, a business office machine or equipment to which the rotation sensor equipped bearing assembly can be facilitated.

Since the encoder 2 is provided with the projected piece 2b protruding axially from the flat surface area 2a for detent purpose, the phase alignment with the shaft 21 is easy to accomplish and this projected piece 2b can be utilized for the detection of the point of origin. Also, since the projected piece 2b is received within the shaft insertion portion 11b in the lid member 11, the possibility can be avoided that the gap between the projected piece 2b and the lid member 11 at the outer periphery of the cutout 21a in the shaft 21, which is rendered to be the flat surface of the D-cut shape, to thereby perform a function of avoiding an undesirable intrusion of foreign matter through such gap into the inside.

It is to be noted that in the practice of the above described ninth embodiment the use has been shown and described of the three sensors 8A to 8C as the sensor 8, but when the number of the sensor 8 to be mounted on the sensor mounting substrate and/or the number of the magnetized tracks 22 to 24 of the encoder 2 are changed, change can be made to one of that having a simple rotation detecting function, that having a rotational direction detecting function in addition to the simple rotation detecting function or that having a point of origin detecting function in addition to these functions. Example of those combinations is shown in Table 1 below:

TABLE 1

|  | Number of Sensors* | Number of Magnetized Tracks |
|---|---|---|
| Simple Rotation Detect. | 1 | 1 |
| Rotational Direction Detect. | 2 | 1 or 2** |
| Rotational Direction Detect. + Point of Origin Detect. | 3 | 1 or 2** |

*The detecting power of the sensor is chosen to be 1 phase per piece.
**1 represents the case in which the sensor is arranged in the circumferential direction and 2 represents the case in which the sensor is arranged in the axial direction.

Where the number of the sensor and/or the number of the magnetized tracks are altered in various ways, if the shape except for the wiring pattern on the printed circuit substrate 7a of the sensor mounting substrate 7 and the unified appearance of the encoder 2 are prepared, compatibility can be obtained. For this reason, even where the sensor mounting substrate 7 and the encoder 2 are altered, the sensor housing 4 and/or the lid member 11 can be used in the form of a common product.

Figure 20:
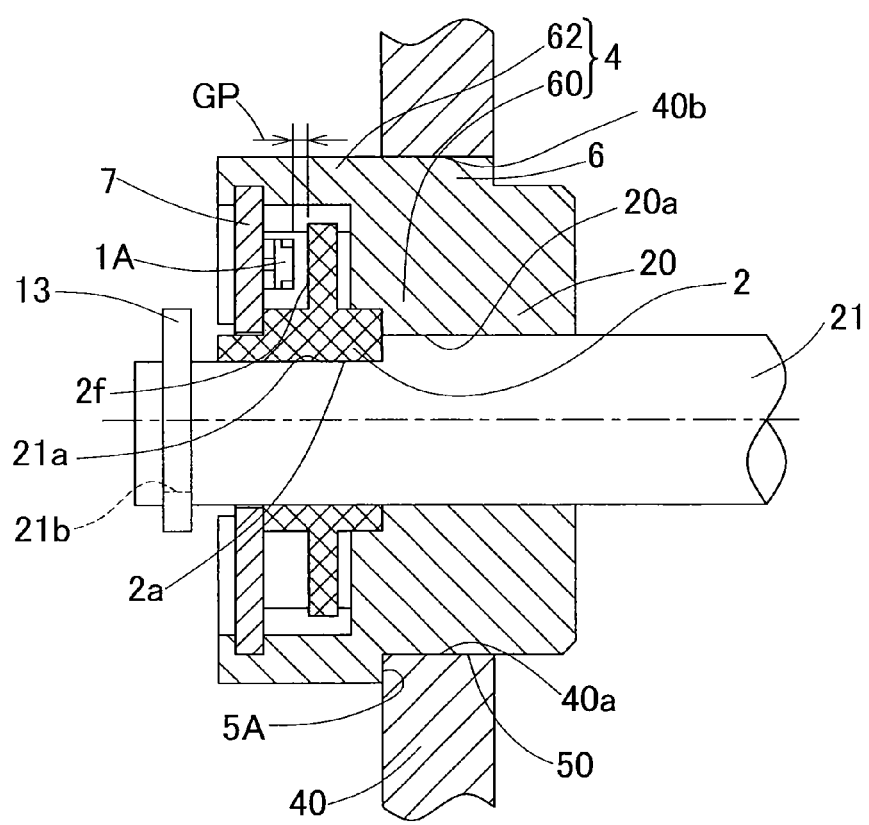
FIG. 20 is a longitudinal sectional view of the rotation sensor equipped bearing assembly designed in accordance with a tenth preferred embodiment of the present invention.
Figure 21:
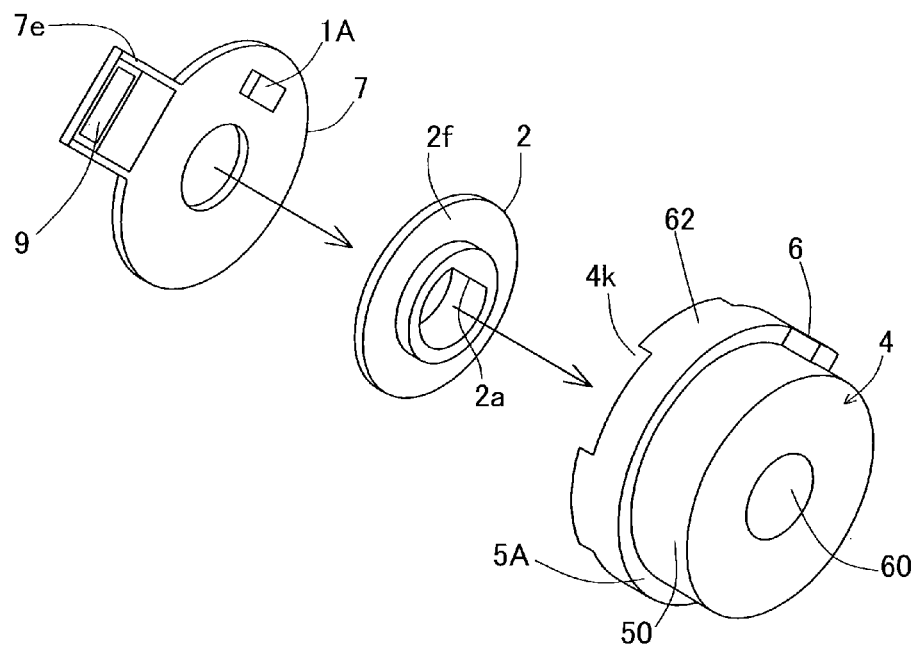
FIG. 21 is an exploded perspective view of the rotation sensor equipped bearing assembly.

The rotation sensor equipped bearing assembly designed in accordance with a tenth preferred embodiment of the present invention will now be described with particular reference to FIGS. 20 to 24. As shown in FIG. 20, in this rotation sensor equipped bearing assembly an optical sensor 1A is employed in place of the rotation sensor 1 which is used in the practice of any one of the previously described embodiments. This optical sensor 1A is of an axial gap type facing a to-be-detected surface 2a of the encoder 2 in the axial direction through a gap Gp. As shown in FIG. 21, this rotation sensor equipped bearing assembly includes the sensor housing 4, the sensor mounting substrate 7, the optical sensor 1A and the encoder 2. It is to be noted that component parts similar to those employed in and described in connection with any one of the previously described embodiments are designated by like reference numerals and, therefore, the details thereof are not reiterated for the sake of brevity.

Figure 22:
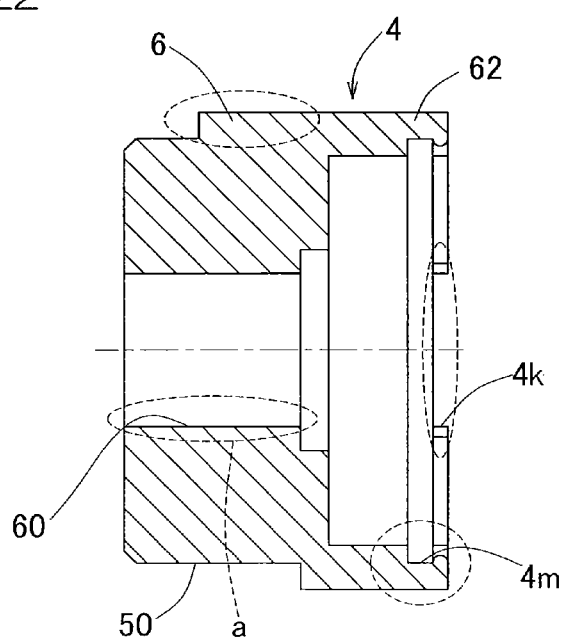
FIG. 22 is a longitudinal sectional view of a sensor housing employed in the rotation sensor equipped bearing assembly.

As shown in FIG. 20, the sensor housing 4 employed in the rotation sensor equipped bearing assembly shown therein includes an integral component comprised of a bearing unit 60, provided at a first end portion (right end portion as viewed in FIG. 20) of such sensor housing 4, and an annular housing portion 62 provided adjacent to the second end portion (left end portion as viewed in FIG. 20) opposite to the first end portion for enclosing the outer periphery of the shaft 21, with the bearing unit 62 and the housing portion 62 being provided integrally with each other and juxtaposed relative to each other in the axial direction. The sensor housing 4 may be made of either a metallic material or a resinous material. The bearing unit 60 includes the bearing unit 20 having an inner peripheral surface 20a of a cylindrical surface shape held in contact with the shaft 21. Although so far shown in FIG. 20 the entirety of the sensor housing 4 is an integral component of the same material, in a portion that defines an inner peripheral surface, which undergoes a sliding contact with the shaft 21, a raw material having a higher wear resistance than that used in the remaining portion may be employed. It is to be noted that portions a shown by the broken lines in FIG. 22 represent portions which function as a sliding bearing for the bearing unit 20 and the shaft 21 (best shown in FIG. 20).

As shown in FIG. 20, the outer periphery of a portion of the sensor housing 4, which will serve the bearing unit comprised of the sliding bearing, is provided with a machine mounting surface 50 of a cylindrical surface shape and detent member 6 protruding radially outwardly from a circumferential portion of the machine mounting surface 50. A side face of the housing 40, which will serve as a fitting frame for a machine, is formed with a mounting hole 40a for receiving the rotation sensor equipped bearing assembly and a detent hole 40b in which the detent member 6 is engaged. Of the sensor housing 4, the boundary between an outer periphery of a portion, which will serve as the housing unit 62, the machine mounting surface 50 is provided with an annular step 5A for axially positioning the rotation sensor equipped bearing assembly. By designing the outer peripheral surface of the machine mounting surface 50 to have a diameter smaller than the outer peripheral surface of the housing unit 62, the step 5A referred to above is formed. The machine mounting surface 50 is engaged in the mounting hole 40a of the housing 40 and the detent member 6 is engaged in a detent hole 40b. By so doing, the rotation sensor equipped bearing assembly is positioned radially and circumferentially relative to the machine. Also, with the step 5A held in abutment with an inner side face around the mounting hole 40a of the housing 40, the rotation sensor equipped bearing assembly is axially positioned relative to the machine.

Figure 24:
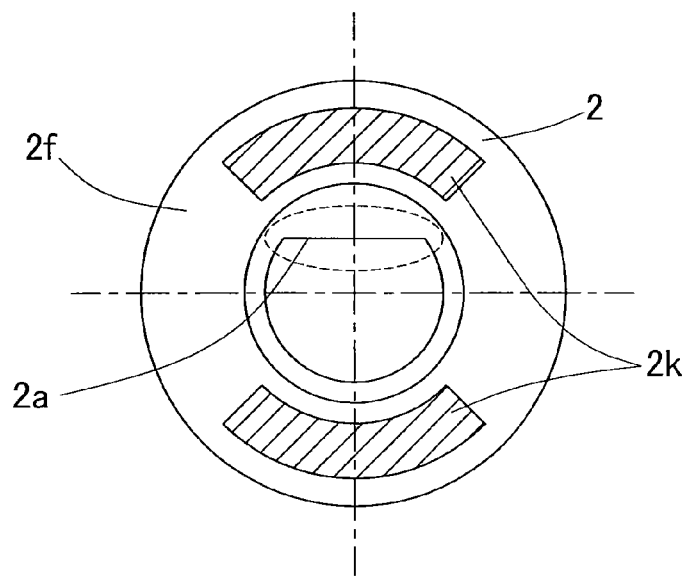
FIG. 24 is a front elevational view of an encoder employed in the rotation sensor equipped bearing assembly.

The encoder 2 is made of a resinous material and is formed to represent an annular shape having a flange portion 2f extending radially outwardly. One side surface of the flange 2f, which faces the sensor 1A, becomes a to-be-detected surface. It is, however, to be noted that an encoder made of a metallic material can be adopted. As shown in FIG. 24, the encoder has a reflective material 2k capable of reflecting light, painted on the to-be-detected surface thereof, or recess and projections alternately disposed at the to-be-detected surface in a circumferential direction. The sensor 1A detects reflected light with the reflective material 2k and the detection is disabled at a portion where no reflective material 2k is painted. In the case that the recesses and projections are circumferentially alternately arranged on the to-be-detected surface of the encoder 2, the encoder 2 is formed of, for example, a material excellent in light reflectance and the difference in intensity is caused in the reflected light by means of the recesses and projections. The sensor 1A outputs a signal proportional to the intensity of the reflected light. The encoder 2 may include on the to-be-detected surface thereof a light permeable portion, formed by the use of a slitting process, through which light passes and a reflecting portion with the light permeable portion and the reflecting portion being circumferentially alternately arranged.

The sensor 1A is employed in the form of, for example, a reflective type photo-sensor for the rotation detection and is mounted on the sensor mounting substrate 7. This reflective type photo-sensor is made up of, for example, a light emitting portion, comprised of a light source, and a light receiving portion comprised of, for example, a phototransistor. When an electric current is passed to the light emitting portion to cause emission of light and light reflected from the to-be-detected surface of the encoder 2 is received, an electric current flows through the phototransistor. The phototransistor outputs a signal proportional to the intensity of the reflected light, that is, detects a change in voltage value.

Figure 23:
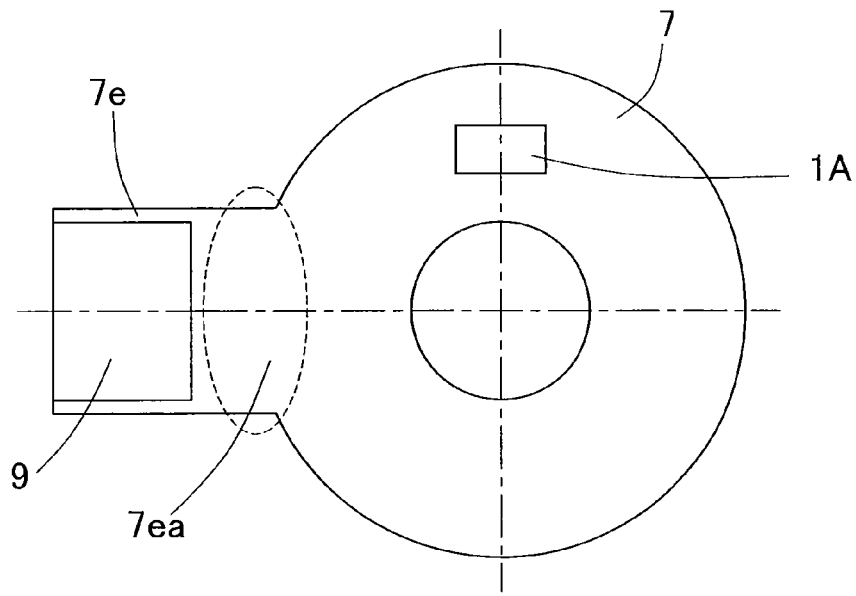
FIG. 23 is a rear view of a sensor mounting substrate employed in the rotation sensor equipped bearing assembly.

The sensor mounting substrate 7 employed in the practice of this embodiment concurrently serves as a lid for accommodating the encoder 2 and the sensor 1A within the housing portion 62. As best shown in FIG. 23, the sensor mounting substrate 7 is formed to represent a substantially disk-like, annular shape. As best shown in FIG. 22, in the vicinity of an opening of the inner peripheral surface of the housing portion 62, an annular groove 4m for receiving therein an outer peripheral surface of the sensor mounting substrate 7 is formed. Into this annular groove 4m the sensor mounting substrate 7 is removably fitted. As shown in FIG. 20, of the outer peripheral portion of the shaft 21, at an axial position on the front side (left side of FIG. 20) of the sensor mounting substrate 7, a snap ring engagement groove 21b is formed. When the snap ring 13 in the form of an E-ring is engaged in the snap ring engagement groove 21b in the shaft 21, the rotation sensor equipped bearing assembly is prevented from separating out of the housing 40. When the rotation sensor equipped bearing assembly is likely to undesirably separate from the housing 40, the sensor mounting substrate 7 is brought into abutment with the snap ring 13. By doing so, movement of the rotation sensor equipped bearing assembly into the housing 40 can be regulated. Accordingly, the undesirable separation of the rotation sensor equipped bearing assembly through the mounting hole 40a of the housing 40 is avoided.

A circumferential portion of a rear surface (right side of FIG. 20) of the sensor mounting substrate 7, which faces the to-be-detected surface of the encoder 2 through the axial gap Gp, has the sensor 1A mounted thereon. As best shown in FIG. 23, of the outer peripheral edge of the sensor mounting substrate 7, for example, a circumferential position displaced 90° in phase from a mounting position of the sensor 1A is provided with an extension 7e extending a predetermined distance radially outwardly from the outer peripheral edge. This extension 7e referred to above extends radially outwardly from a substrate drawing groove 4k (best shown in FIG. 21) which is formed in the outer peripheral surface of the housing portion 62. A substrate positioning portion lea, which is a base end of the extension 7e, is formed for engagement in the substrate drawing groove 4k in the housing portion 62 as referred to above. Accordingly, the sensor mounting substrate 7 is circumferentially positioned relative to the housing portion 62. The wiring connector 9 is mounted on the extension 7e of the sensor mounting substrate 7e. Also, an electric wiring portion (not shown) for electrically connecting between the sensor 1A and the wiring connector 9 is mounted thereon the rear surface of the sensor mounting substrate 7.

According to the rotation sensor equipped bearing assembly of the structure described hereinabove, when the encoder 2 rotates integrally together with the shaft 21, the sensor 1A within the housing portion 62 detects a signal necessary to detect the direction of rotation. From this detection signal, the rotation of the shaft 21 can be detected. By way of example, in the event of occurrence of an abnormality in the rotational detection performed by the sensor 1A, the sensor 1A is removed out of the housing portion 62 and is then replaced. The remaining component parts can be reused if so desired. When the sensor mounting substrate 7 is detached from the sensor housing 4, only a broken-down component part out from the sensor 1A, the wiring connector 9, the sensor mounting substrate 7, the bearing portion 60 comprised of the sliding bearing and the encoder 2 can be replaced. Since the optical sensor 1A is employed as the sensor, the encoder 2 of a structure made of, for example, the standard resinous material can be employed. Where the encoder 2 made of the resinous material is used, the cost can be reduced as compared with the use of the conventional encoder made of a magnet.

The sensor 1A referred to above faces the to-be-detected surface of the encoder 2 through the axially extending gap Gp. In such case, despite that the bearing portion 20, comprised of the sliding bearing, and the housing portion 62 are of a unitary structure in which they are axially juxtaposed, the rotation sensor equipped bearing assembly can be compactized in the axial direction and the compatibility, when incorporating in the office machine, can be increased. Where the encoder 2 includes the light transmitting portion, formed by a slitting technique, for transmitting light therethrough and the light reflecting portion for reflecting light, and they are circumferentially alternately arranged, the sensor 1A can detect depending on the presence or absence of the reflected light. Also, not only can the light transmitting portion and the reflecting portion be formed simply, but also the weight of the encoder 2 can be reduced.

Where the encoder 2 is made of the resinous material, the cost can be reduced as compared with the conventional encoder made of a magnet, and the weight of the encoder 2 can also be reduced. Where the sensor 1A is employed in the form of a reflective type photo-sensor, this photo-sensor outputs a signal proportional to the intensity of the reflected light. If a signal processing unit is provided for processing this signal by means of a threshold value, the rotation detection or the like can be accomplished.

Since the sensor mounting substrate 7, on which the sensor 1A is to be mounted, is provided removably in the housing portion 62, the sensor 1A can be easily and precisely assembled relative to the to-be-detected surface of the encoder 2. In particular, since in the vicinity of the opening of the inner peripheral surface of the housing portion 62 the annular groove 4m, in which the outer peripheral edge of the sensor mounting substrate 7 is engaged, is formed, the sensor mounting substrate 7 can be easily and removably fitted to the annular groove 4m, and also the sensor mounting substrate 7 can be axially and radially assembled precisely. In addition, since the substrate positioning portion lea is engageably constituted in the substrate drawing groove 4k of the housing portion 62, the sensor mounting substrate 7 can be precisely positioned in the circumferential direction relative to the housing portion 62.

It is to be noted that when the sensor mounting substrate 7 is detached from the housing portion 62, at least one of the sensor mounting substrate 7, the bearing portion 60 comprised of the sliding bearing, and the encoder 2 may be made replaceable. In such case, in a condition with the sensor mounting substrate 7 having been removed from the housing portion 62, only the faulty or broken-down component part can be replaced. Since the sensor mounting substrate 7 concurrently serves as the lid for accommodating the encoder 2 and the sensor 1A within the housing portion 62, the removal of the sensor mounting substrate 7 from the housing portion 62 makes it possible to disassemble into individual component parts easily. For this reason, only the faulty or broken-down component part is replaced, allowing the remaining component parts to be reused.

Eleventh to fourteenth preferred embodiments of the present invention will be hereinafter described in detail. It is, however, to be noted that in the description that follows, component parts similar to those shown and described in connection with the preceding embodiments are shown by like reference numerals and, therefore, the details thereof are not reiterated for the sake of brevity. Where only a part of the construction is described, the remaining part of the construction is to be understood as similar to that in the preceding embodiment or embodiments.

Figure 25:
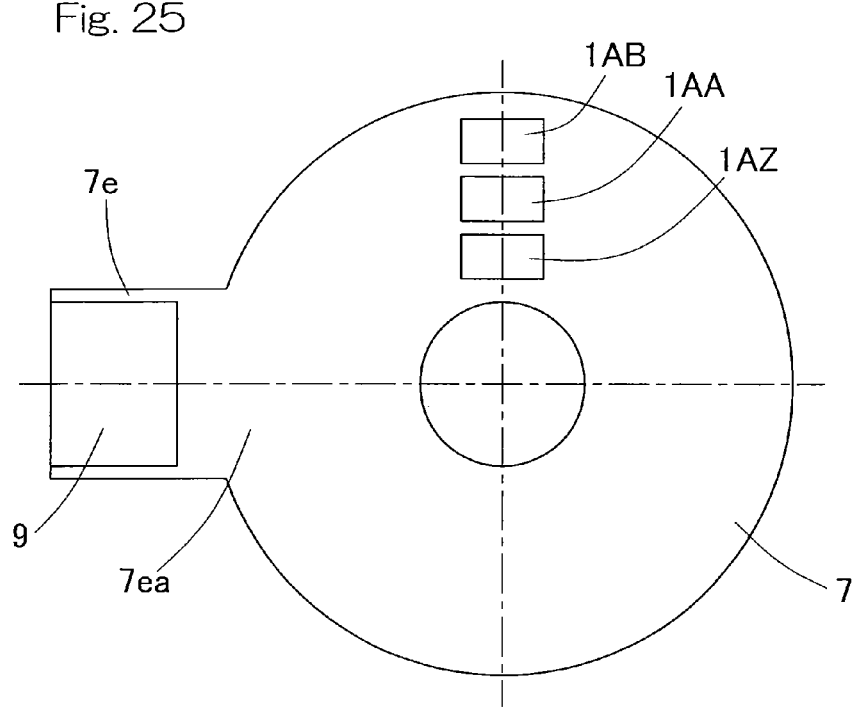
FIG. 25 is a rear view of the rotation sensor equipped bearing assembly designed in accordance with an eleventh preferred embodiment of the present invention.
Figure 26:
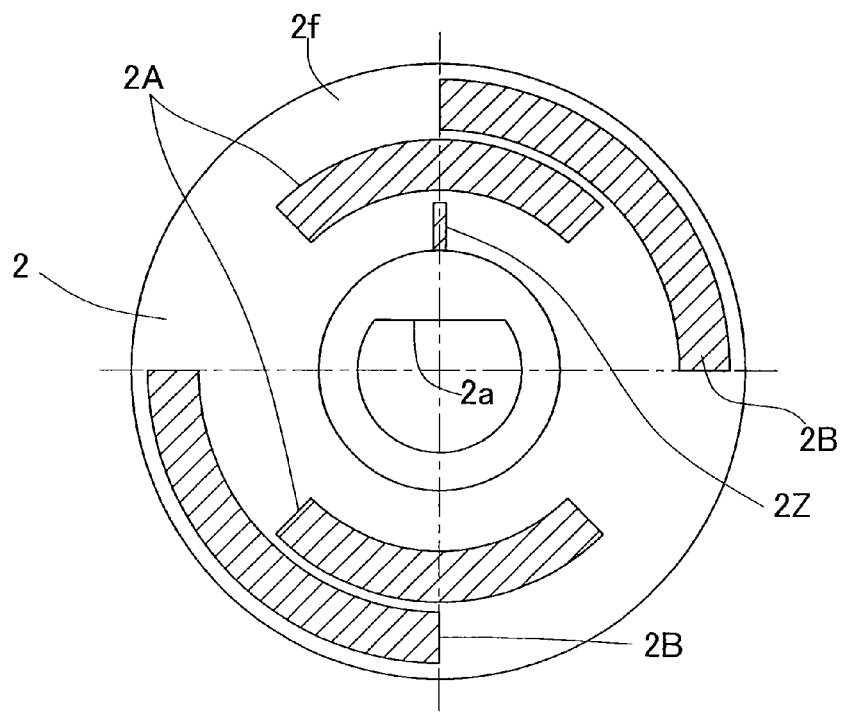
FIG. 26 is a front elevational view of an encoder employed in the rotation sensor equipped bearing assembly.

In the eleventh embodiment shown in FIG. 25, a plurality of, for example, three, sensors 1A are arranged in a radially extending row on the sensor mounting substrate 7 of an axial gap type and spaced a predetermined distance from each other. In this example, a reflective type photo-sensor 1AB for B phase is positioned on an outer peripheral side of the sensor mounting substrate 7, a reflective type photo-sensor 1AZ for Z phase is positioned on an inner peripheral side of the sensor mounting substrate 7, and a reflective type photo-sensor 1AA for A phase is positioned on a radially intermediate position between the photo-sensors 1AB and 1BZ. The rotation sensor equipped bearing assembly including this sensor mounting substrate 7 is such that, as best shown in FIG. 26, of the to-be-detected surface of the encoder 2, light reflecting portions 2B, 2Z and 2A are provided on three concentric circles that correspond respectively to the sensors 1AB, 1AZ and 1AA. In the to-be-detected surface of the encoder 2, the light reflecting portion 2B for B phase is provided on an outer peripheral side, the light reflecting portion 2Z for Z phase is provided on an inner peripheral side and the light reflecting portion 2A for A phase is provided at a radially intermediate position. By means of those sensors 1AB, 1AZ and 1AA and the light reflecting portions 2B, 2A and 2A of the encoder 2, the A, B and Z phases can be detected. Also, when respective positions where the light reflecting portions 2B, 2Z and 2A of the encoder 2 are formed are changed, the resolving power can be altered.

Figure 27:
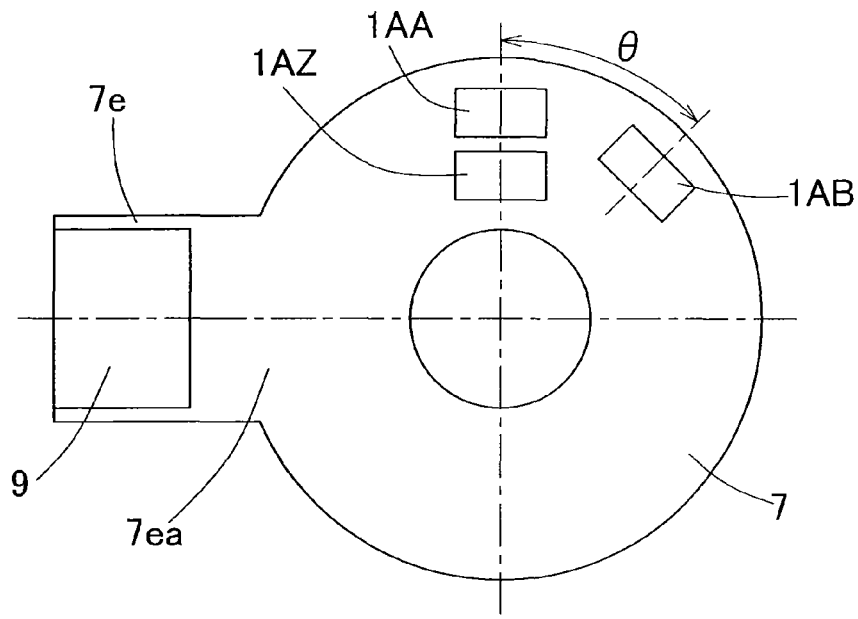
FIG. 27 is a rear view of the rotation sensor equipped bearing assembly designed in accordance with a twelfth preferred embodiment of the present invention.
Figure 28:
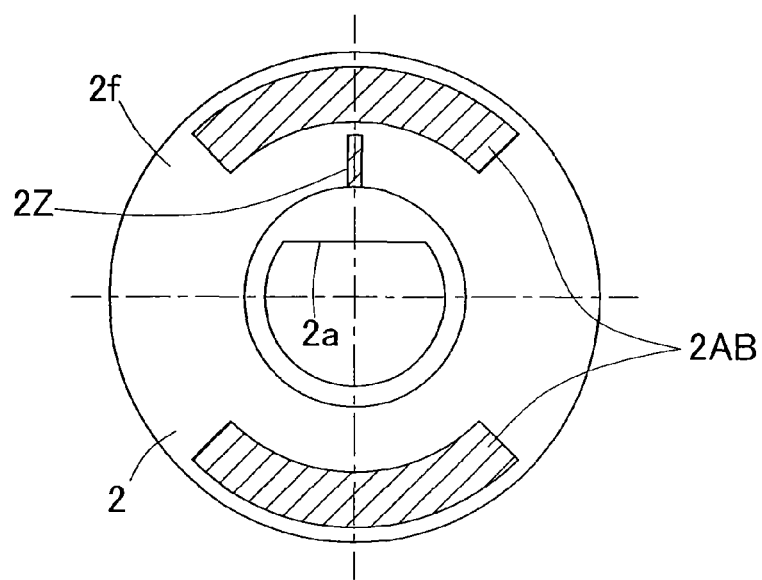
FIG. 28 is a front elevational view of an encoder employed in the rotation sensor equipped bearing assembly.

As shown in FIG. 27 in accordance with the twelfth preferred embodiment, on the sensor mounting substrate 7 of the axial gap type, the reflective type photo-sensor 1AB for the rotation detection B phase may be disposed at a circumferential position concentrically with the reflective type photo-sensor 1AA for A phase and spaced a phase difference θ therefrom in the circumferential direction. In the sensor mounting substrate 7 referred to above, the reflective type photo-sensor 1AZ for Z phase is arranged on the inner peripheral side of the reflective type photo-sensor 1AA for A phase. The rotation sensor equipped bearing assembly including this sensor mounting substrate 7 is such that as best shown in FIG. 28, of the to-be-detected surface of the encoder 2, the light reflective portions 2AB and 2Z are provided on respective concentric circles corresponding to the plurality of the sensors 1AB, 1AA and 1AZ. The light reflecting portion 2AB on the outer peripheral side is rendered to be a light reflective portion for A and B phases concurrently.

By the use of the encoder 2 equipped with the light reflecting portions 2AB and 2Z, signals A and B required to detect the direction of rotation can be obtained, and the phase difference θ converts into a resolving power. Also, since there is no need to dispose all of the sensors on the sensor mounting substrate 7 in a radially extending row, the radial dimension of the sensor mounting substrate 7 can be suppressed. Accordingly, the rotation sensor equipped bearing assembly can be compactized in the radial direction. It is, however, to be noted that there is the need to change the phase difference θ in dependence on the resolving power. The phase difference θ can be determined from θ=360/4n [°] (in which n represents the resolving power in terms of [pls/rev]). Also, where the sensors 1AA and 1AB for A and B phases near to each other, it is recommended to dispose the sensors 1AA and 1AB for A and B phased at circumferential positions of θ'=θ+180°.

The rotation sensor equipped bearing assembly of the radial gap type designed in accordance with the thirteenth preferred embodiment will now be described with particular reference to FIGS. 29 to 34. This radial gap type shown therein is such that the sensor 1A confronts the to-be-detected surface of the encoder 2 through the radial gap Gp. As best shown in FIG. 30, the rotation sensor equipped bearing assembly includes the sensor housing 4, the sensor mounting substrate 7, the optical sensor 1A, the encoder 2 and the lid member 11.

Figure 29:
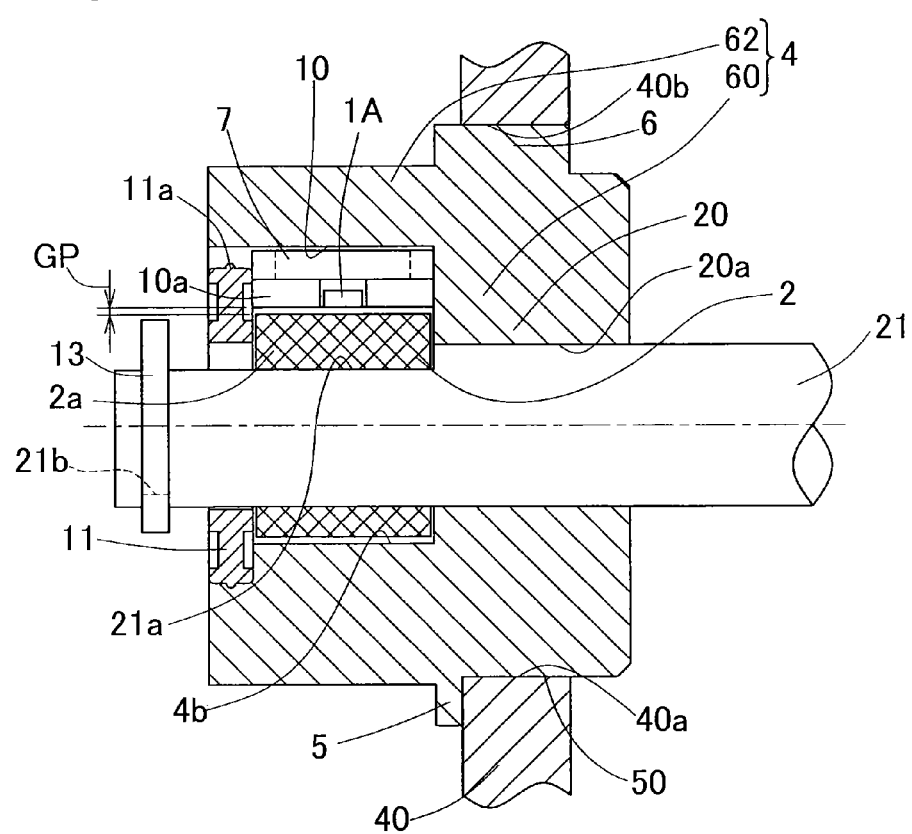
FIG. 29 is a longitudinal sectional view of the rotation sensor equipped bearing assembly designed in accordance with a thirteenth preferred embodiment of the present invention.
Figure 30:
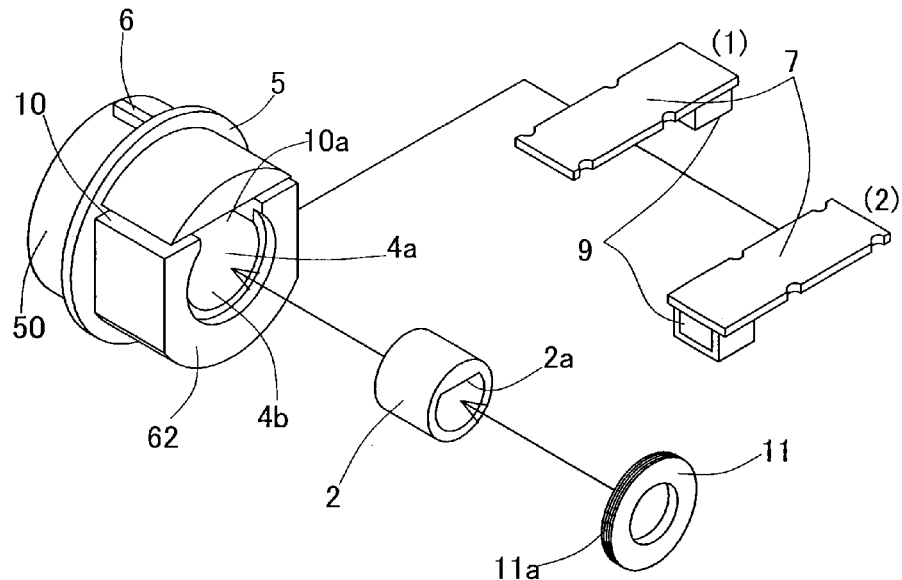
FIG. 30 is an exploded perspective view of the rotation sensor equipped bearing assembly.

As shown in FIG. 29, the sensor housing 4 is a component part, in which the housing portion 62 of an annular configuration enclosing the outer periphery of the shaft 21 and the bearing portion 20 in the form of a sliding bearing are integrally provided in an axially juxtaposed fashion. The housing portion 62 has an outer peripheral portion formed integrally with the flanged positioning portion 5 and the machine mounting surface 50 over the entire periphery thereof. With the positioning portion 5 engaged with the housing 40 which will serve as a fitting frame, the housing portion 62 is positioned axially. As best shown in FIG. 30, an outer diametric portion of the housing portion 62 on a bearing installation side end is provided with the detent member 6 engaged in the detent hole 40b in the housing 40, which member 6 is provided as a projection integral with the positioning portion 5. The machine mounting surface 50 is engaged in the fitting hole 40a of the housing 40 and the detent member 6 is engaged in the detent hole 40b. By so doing, the rotation sensor equipped bearing assembly can be radially and circumferentially positioned relative to the machine or equipment. Also, with the positioning portion 5 held in abutment with an inner side surface (left side surface of FIG. 29) of the housing 40 around the fitting hole, the rotation sensor equipped bearing assembly is axially positioned relative to the machine or equipment.

Figure 33:
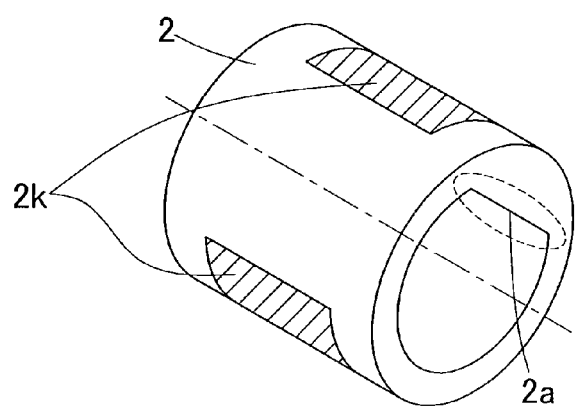
FIG. 33 is a perspective view of an encoder employed in the rotation sensor equipped bearing assembly.

The encoder 2 is made of a resinous material and is a cylindrical member adapted to be externally mounted on the shaft 21. The outer surface of the encoder 2 becomes a to-be-detected surface. It is to be noted that the encoder made of a metallic material can be adopted. As shown in FIG. 29, the encoder 2 is positioned within the housing 62, having been mounted on the shaft 21. As shown in FIG. 33, the encoder 2 has a reflective material 2k capable of reflecting light, applied to the to-be-detected surface thereof, or recesses and projections formed by alternately arranging in the circumferentially on the to-be-detected surface of the encoder 2.

As shown in FIG. 29, of the outer peripheral surface of the shaft 21, an outer peripheral surface ranging from the axial end to the site supported by the bearing portion 60 comprised of the sliding bearing is formed with a cutout 21a which is rendered to be a flat surface extending axially. As shown in FIG. 33, the inner peripheral surface of the encoder 2 is formed with the flat surface area 2a for detent purpose which is engageable with the cutout 21a of the shaft 21.

Figure 32:
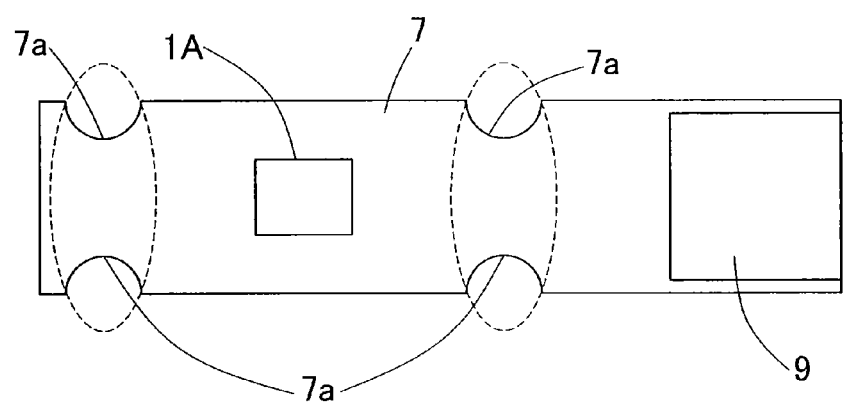
FIG. 32 is a rear view of a sensor mounting substrate used in the rotation sensor equipped bearing assembly.

As shown in FIG. 32, the sensor mounting substrate 7 is a printed circuit substrate having its schematic top plan shape represented by a square shape. On one surface of this sensor mounting substrate, the sensor 1A and the wiring connector 9 are fixed. Also, the sensor mounting substrate 7 has mounted thereon an electric wiring portion (not shown) for electrically connecting the sensor 1A and the wiring connector 9 together. The sensor mounting substrate 7 is mounted for removal from the other end portion of the housing portion 62 (the left end portion as shown in FIG. 29). As will be described later, in a condition with the sensor mounting substrate 7 mounted on the housing portion 62, the sensor 1A fixed to the sensor mounting substrate 7 confronts the to-be-detected surface of the encoder 2 through the radial gap Gp. Together therewith, the wiring connector 9 is positioned radially outwardly of the outer peripheral surface of the housing portion 62.

As shown in FIG. 30, a half portion of the housing portion 62 on the side opposite to the site of installation of the sliding bearing unit is provided with an axially extending substrate mounting groove 10. This substrate mounting groove 10 is in the form of an axially extending slit formed so as to spread in a direction, which is to define a chord of the circular sectional shape of the outer peripheral surface of the housing portion 62, and opens towards one end face of the housing portion 62 with its opposite side edges opening at the outer periphery of the housing portion 62. With the sensor mounting substrate 7 engaged in this substrate mounting groove 10, as shown in FIG. 29, the sensor 1A fixed to the sensor mounting substrate 7 is mounted on the housing portion 62, and at the same time, the sensor 1A faces the encoder 2 in a radial direction. The substrate mounting groove 10 referred to above has a groove inner wall surface on the side adjacent the shaft insertion hole 4a in the housing portion 62, which groove inner wall surface is located at a position which is to define a chord of the encoder accommodating space 4b comprised of a cylindrical surface, and is communicated at an intermediate portion in a widthwise direction with the encoder accommodating space 4b which is a large diametric portion of the shaft insertion hole 4a. This communicating portion becomes an encoder confronting port 10a. A predetermined gap is set between the sensor 8 and the encoder 2.

The wiring connector 9 is provided in one end portion of the sensor mounting substrate 7, which protrudes in a direction laterally outwardly of the housing portion 62 from the substrate mounting groove 10 in a fashion with the sensor mounting substrate 7 having been engaged in the substrate mounting groove 10 in the housing portion 62. Also, the sensor mounting substrate 7 is so rendered as to be engageable in the substrate mounting groove 10, even though a position of protrusion of a connector installing side end portion from the substrate mounting groove 10 is reversed left and right. FIG. 30 shows the manner (1), in which the wiring connector 9 protrudes laterally rightwardly of the housing portion 62, and the manner (2), in which it protrudes laterally leftwardly of the housing portion. Further, a fixing position of the sensor 1A to the sensor mounting substrate 7 is so set that even when the substrate mounting groove 10 is reversed in position the position of the sensor 1A relative to the encoder 2 can assume the same position before such reversion.

Figure 31:
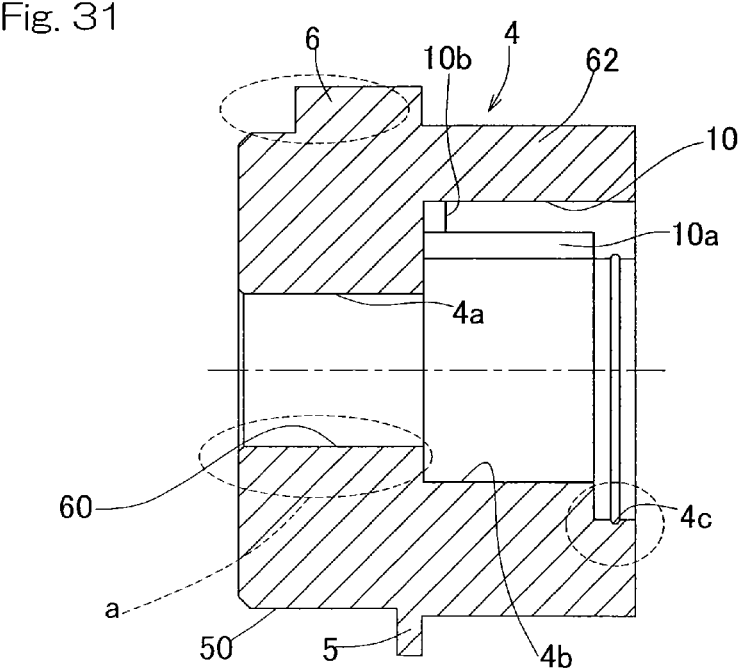
FIG. 31 is a longitudinal sectional view of a sensor housing employed in the rotation sensor equipped bearing assembly.

As shown in FIG. 32, axially oriented opposite end faces of the sensor mounting substrate 7 are provided respectively with a pair of recesses 7a and 7a in a laterally oriented fashion for preventing lateral detachment of the housing portion 62 from the substrate mounting groove 10. The pair of the recesses 7a and 7a in those opposite end faces are disposed at the same positions with each other. As shown in FIG. 31, a bottom surface of the substrate mounting groove 10, which confronts the end faces of the sensor mounting substrate 7, is provided with a pair of projections 10b and 10b engageable respectively in the recesses 7a in the sensor mounting substrate 7. When with the sensor mounting substrate 7 engaged in the substrate mounting groove 10 the recesses 7a in the sensor mounting substrate 7 are engaged with the respective projections 10b in the substrate mounting groove 10, a scheme to prevent the sensor mounting substrate 7 from detaching laterally of the substrate mounting groove 10 can be embodied. It is, however, to be noted that the recesses 7a in the sensor mounting substrate 7 may be replaced with projections and, at the same time, the projections 10b in the substrate mounting groove 10 may be replaced with recesses.

The lid member 11 provided at an end portion side of the housing portion 62, which is provided with the substrate mounting groove 10, is similar to that shown in and described with particular reference to FIGS. 19A and 19B and is removably provided in the housing portion 62. More specifically, the lid member 11 has an annular engagement projection 11a defined at a location intermediate of the widthwise direction of an outer periphery. As best shown in FIG. 31, one end portion of the inner peripheral surface of the housing 62 is provided with an annular engagement recess 4c. When the engagement projection 11a of the lid member 11 is engaged in the engagement recess 4c referred to above, not only is the sensor mounting substrate 7 be fixed axially to the housing portion 62, but the encoder 2 is also accommodated within the housing portion 62. The lid member 11 in this case concurrently serves as an axially detachment preventing member for avoiding an axial detachment of the encoder 2 and the sensor mounting substrate 7. When the engagement projection 11a of the lid member 11 is disengaged from the engagement recess 4c, the various component parts can be disassembled. As shown in FIG. 29, the lid member 11 has an inner diametric dimension so set as to enable the flat surface area 2a in the inner periphery of the encoder 2 to be viewable from the outside of the lid member 11. Accordingly, a work to insert the shaft 21 into the rotation sensor equipped bearing assembly can be easily accomplished.

According to the rotation sensor equipped bearing assembly designed in accordance with the thirteenth embodiment hereinabove described, since the sensor 1A is held in fact to face relation with the to-be-detected surface of the encoder 2 through the radial gap Gp, the rotation sensor equipped bearing assembly can be compactized in the axial direction and the compatibility, when incorporating in the office machine, can be increased. Also, since the sensor 1A is made installable within the housing portion 62 with the sensor mounting substrate 7 engaged in the substrate mounting groove 10 of the housing portion 62, the assemblage is easy to achieve and the axial length can also be reduced.

Since the lid member 11 is removably provided in the housing portion 62, in the event of, for example, the occurrence of an abnormality in the rotation detection by the sensor 1A, by disengaging the engagement projection 11a of the lid member 11 from the engagement recess 4c, the sensor mounting substrate 7 is removed from the inside of the housing portion 62 and then the sensor 1A can be replaced. The remaining component parts can be made reusable. When the lid member 11 is removed from the housing portion 62, only a faulty or broken-down component part of the sensor 1A, the wiring connector 9, the sensor mounting substrate 7, the bearing portion 60 comprised of the sliding bearing, and the encoder 2 can be replaced. Also any other component part parts free from failure can be reused.

Figure 34:
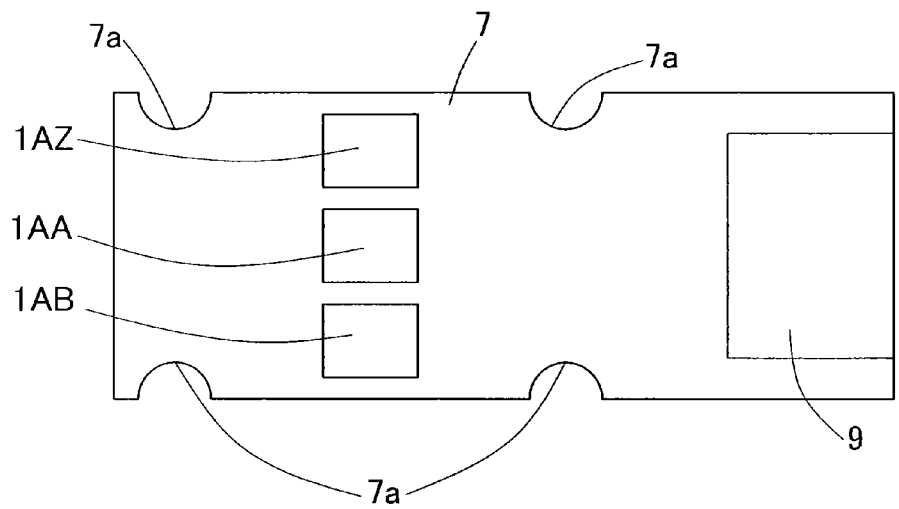
FIG. 34 is a rear view of a sensor mounting substrate used in the rotation sensor equipped bearing assembly designed in accordance with a fourteenth preferred embodiment of the present invention.
Figure 35:
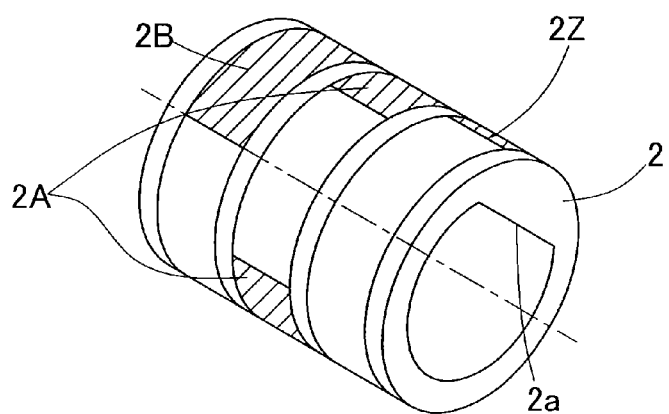
FIG. 35 is a perspective view of an encoder employed in the rotation sensor equipped bearing assembly.

On the sensor mounting substrate 7 of the radial gap type pertaining to the fourteenth preferred embodiment shown in FIG. 34, a plurality of, for example, three, sensors 1A are arranged in a radially extending row and spaced a predetermined distance from each other. In this example, a reflective type photo-sensor 1AZ for Z phase and a reflective photo-sensor 1AB for B phase are arranged at the opposite end portions of the sensor mounting substrate 7 and a reflective type photo-sensor 1AA for A phase is arranged between those sensors 1AZ and 1AB. The rotation sensor equipped bearing assembly including this sensor mounting substrate 7 is such that, as best shown in FIG. 35, of the to-be-detected surface of the encoder 2, which surface is an outer peripheral surface of the encoder 2, light reflecting portions 2B, 2Z and 2A are provided at respective axial positions corresponding to the plurality of the sensors 1AB, 1AZ and 1AA. In the to-be-detected surface of the encoder 2, the light reflecting portion 2Z for Z phase is provided at a position on the side of one axial end portion, the light reflecting portion 2B for B phase is provided at a position on the side of the axially other end portion, and the light reflecting portion 2A for A phase is provided at an axially intermediate position. By means of those sensors 1AB, 1AZ and 1AA and the light reflecting portions 2B, 2Z and 2A of the encoder 2, the A, B and Z phases can be detected. Also, the direction of insertion of the encoder 2 relative to the shaft 2 may be altered by detaching the lid member 11 from the housing portion 62. In this case, the sensor mounting substrate 7 can be used having been mounted on the substrate mounting groove 10 in the reversed position, in which the sensor mounting substrate is reversed leftward or rearwards.

Any of the embodiments, which have been shown and described with reference to FIGS. 1 to 12, is to be understood as including the following mode which does not include such a requirement that the sensor mounting substrate 7 is removably mounted from the opposite or second end portion of the sensor housing 4.

[Mode 1]

The rotation sensor equipped bearing assembly according to the mode 1 is a rotation sensor equipped bearing assembly of a type in which a rotation sensor includes a sensor housing having a bearing unit provided in an inner peripheral portion of a shaft insertion hole, an annular encoder adapted to be rotated by a shaft supported by the bearing unit, and a sensor to detect the encoder. The sensor housing is provided with an axially extending slit-like substrate mounting groove formed in a direction, which will define a chord of the circular section of an outer peripheral surface of the sensor housing, and the sensor mounting substrate is engaged in this mounting groove.

Also, any of the embodiments, which have been shown and described with reference to FIG. 13 to FIGS. 19A and 19B, is to be understood as including the following modes.

[Mode 2]

The rotation sensor equipped bearing assembly according to the mode 2 includes a sensor housing, in which a bearing portion having its inner peripheral surface contactable with a shaft and an annular housing portion enclosing an outer periphery of the shaft are integrally provided in an axially juxtaposed fashion, an encoder mounted on the shaft and positioned within the housing portion, and a sensor mounting substrate having a sensor mounted thereon to detect the encoder and being detachably inserted within the housing portion from one end thereof opposite to the bearing unit.

[Mode 3]

In the mode 2 referred to above, the sensor housing has a substrate installation window defined in a portion of a circumferential direction so as to extend from inside to outside, and vice versa, in a radial direction and also has a substrate receiving portion comprised of a projection or a recess accommodated within the substrate installation window. The sensor mounting substrate is received by the substrate receiving portion to be arranged within the substrate installation window and a wiring connected with the sensor mounting substrate is drawn from the substrate installation window towards an outer diametric side.

[Mode 4]

In the mode 3 referred to above, a surface of the housing portion in the sensor mounting substrate, which faces outwards, has a connector mounted thereon for connection with the wiring.

[Mode 5]

In the mode 3 referred to above, is provided a lid member to close an opening in one end portion of the housing portion opposite to the bearing unit with the outer periphery of the shaft and being removably fitted to the housing portion and the sensor mounting substrate received by the substrate receiving portion is prevented by the lid member from being detached to thereby fix it to the housing portion.

[Mode 6]

In the mode 2 referred to above, the shaft has a cutout defined in a circumferential portion of an outer peripheral surface, which cutout is of a shape formed by cutting to a flat surface. The encoder has a circumferential portion of an inner peripheral surface provided with a flat surface area of a flat surface, which engages in the cutout.

[Mode 7]

In the mode 2 referred to above, the encoder has an annular rotation detection magnetized track having magnetic poles arranged in a circumferential direction.

[Mode 8]

In the mode 2 referred to above, the encoder has a plurality of annular rotation detection magnetized tracks each having magnetic poles arranged in a circumferential direction, the respective rotation detection magnetized tracks are different in phase or pitch from each other, and a plurality of sensors are provided to detect the rotation detection magnetized tracks, respectively.

[Mode 9]

In the mode 2 referred to above, the encoder has a circumferential portion thereof provided with a point of origin detection magnetized portion, and, as the sensor, a sensor is provided to detect the point of origin detection magnetized portion.

[Mode 10]

In the mode 9 referred to above, the shaft has a cutout defined in a circumferential portion of an outer peripheral surface, which cutout is of a shape formed by cutting to a flat surface. The encoder has a circumferential portion of an inner peripheral surface provided with a flat surface area of a flat surface, which engages in the cutout. The point of origin detection magnetized portion is provided on a projection to protrude axially from the flat surface portion of the encoder.

[Mode 11]

The rotation sensor equipped bearing assembly according to the mode 2 is used for the support of a shaft of a business office machine or equipment.

In addition, modes 12 to 19 of the rotation sensor equipped bearing assembly provided with an optical sensor, which does not require the use of the sensor mounting substrate 7, will be described.

[Mode 12]

The rotation sensor equipped bearing assembly pertaining to the mode 12 includes a sensor housing having at one end a bearing unit contactable with a shaft, an encoder mounted on the shaft and positioned within the sensor housing, and an optical sensor provided removably within the sensor housing to detect the encoder. According to the construction embodied by this mode, in the event of the occurrence of an abnormality in detecting the rotation with the optical sensor, the optical sensor is removed out of the sensor housing and is then replaced. Other component parts become reusable. Since the optical sensor is removably provided within the sensor housing, the sensor itself can also be reused. Since the optical sensor is used as a sensor, the encoder made of the standard resinous material or the like can be used. Where the encoder made of the resinous material is used, the cost can be reduced as compared with the conventional encoder made of a magnet material.

[Mode 13]

The rotation sensor equipped bearing assembly according to the mode 13 is such that, in the mode 12 referred to above, the encoder may be formed in an annular shape and may be mounted on an outer periphery of the shaft.

[Mode 14]

The rotation sensor equipped bearing assembly according to the mode 14 is such that, in the mode 12 referred to above, the encoder may be made of a resinous material. In this case, as compared with the conventional encoder made of the magnet material, the cost can be reduced and, also, the weight of the encoder can be reduced.

[Mode 15]

The rotation sensor equipped bearing assembly according to the mode 15 is such that, in the mode 12 referred to above, the sensor may be a reflective type photo-sensor. The photo-sensor outputs a signal proportional to the intensity of reflected light. When a threshold value is provided relative to this signal and signal processing is then carried out, the detection of rotation or the like can be accomplished.

[Mode 16]

The rotation sensor equipped bearing assembly according to the mode 16 is such that, in the mode 12 referred to above, the encoder and the sensor may have a point of origin detecting function in addition to a function of detecting the rotation.

[Mode 17]

The rotation sensor equipped bearing assembly according to the mode 17 is such that, in the mode 12 referred to above, it may be used to support the shaft of a business office machine or equipment. The business office machine referred to above includes, for example, a copying machine and a printer or the like. Although in the business office machine the bearing unit receives a relatively light load, the demand for reduction in cost is intensive and the reuse of component parts thereof is strongly desired for. For this reason, an effect of enabling the replacement of only a faulty or broken-down component part out of the component parts can be further effectively exhibited.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Rotation sensor
1A . . . Optical sensor
2, 2A, 2B . . . Encoder
3, 3A, 3B . . . Sensor unit
4 . . . Sensor housing
4a . . . Shaft insertion hole
4b . . . Encoder accommodating space
5 . . . Positioning portion
7 . . . Sensor mounting substrate
7a . . . Recess
8, 8A, 8B . . . Sensor
9 . . . Wiring connector
10 . . . Substrate mounting groove
19a . . . Encoder confronting port
10b . . . Projection
11 . . . Lid member
14 . . . Engagement projection
16 . . . Substrate installation window
17a, 17b . . . Substrate receiving portion
20, 20A to 20C . . . Bearing unit
21 . . . Shaft
40 . . . Housing
60 . . . Bearing unit
62 . . . Housing portion

What is claimed is:

1. A rotation sensor equipped bearing assembly comprising:
a sensor housing having a first end portion thereof provided with a bearing unit that contacts a shaft;
an encoder mounted on the shaft and positioned within the sensor housing; and
a sensor mounting substrate having mounted thereon a sensor and being removably installed within the sensor housing from a second end portion of the sensor housing that is opposite to the first end portion,
in which the sensor housing includes a substrate mounting groove adapted to engage the sensor mounting substrate.

2. The rotation sensor equipped bearing assembly as claimed in claim 1, in which the sensor housing axially neighboring the bearing unit is provided with an encoder accommodating space defined at one end face of the sensor housing so as to open at such end face of the sensor housing, and the encoder is axially insertable within the encoder accommodating space,
in which the substrate mounting groove is opened at the end face of the housing, and
in which the sensor housing includes a lid member to close the encoder accommodating space at the one end portion of the sensor housing, the lid member being configured to prevent the substrate and the encoder from detaching from the sensor housing.

3. The rotation sensor equipped bearing assembly as claimed in claim 2, in which the substrate mounting groove has opposite side edges thereof opening at an outer peripheral surface of the sensor housing.

4. The rotation sensor equipped bearing assembly as claimed in claim 3, in which the sensor mounting substrate is a circuit substrate having the sensor, electronic component parts that are connected with the sensor, and a wiring connector all mounted thereon.

5. The rotation sensor equipped bearing assembly as claimed in claim 3, in which the lid member is incorporated into the sensor housing from an axial direction.

6. The rotation sensor equipped bearing assembly as claimed in claim 3, in which the sensor is fitted to the sensor mounting substrate at a position at which, even when the sensor is inserted in the substrate mounting groove in a fashion reversed leftwards or rightwards when viewed in an axial direction, the position of the sensor relative to the sensor housing remains the same.

7. The rotation sensor equipped bearing assembly as claimed in claim 6, in which the sensor mounting substrate is of a rectangular shape and a bottom surface of the substrate mounting groove is provided with a positioning recess or projection to position the substrate laterally, and in which a projection or a recess engageable with the positioning recess or projection in the bottom surface of the substrate mounting groove is provided at a side of the sensor mounting substrate along the bottom surface of the substrate mounting groove and a side of the sensor mounting substrate along the bottom surface of the substrate mounting groove in a position having been inserted in the leftward or rightward reversed fashion.

8. The rotation sensor equipped bearing assembly as claimed in claim 6, in which the sensor mounting substrate is of a square shape and the lid member is provided with a positioning recess or projection for positioning the substrate laterally, and in which a projection or a recess engageable with the positioning recess or projection in the bottom surface of the substrate mounting groove is provided at a side of the sensor mounting substrate along the bottom surface of the substrate mounting groove and a side of the sensor mounting substrate along the bottom surface of the substrate mounting groove in a position having been inserted in the leftward or rightward reversed fashion.

9. The rotation sensor equipped bearing assembly as claimed in claim 2, in which the substrate mounting groove has an encoder facing port communicated with the encoder accommodating space and the sensor of the sensor mounting substrate engaged in the substrate mounting groove radially faces an outer peripheral surface of the encoder through a gap at a position of the encoder facing port.

10. The rotation sensor equipped bearing assembly as claimed in claim 2, in which the substrate mounting groove comprises a plurality of substrate mounting grooves provided at a plurality of positions in the sensor housing that are different from each other in a circumferential direction and the sensor mounting substrate is engaged in each of the plurality of substrate mounting grooves.

11. The rotation sensor equipped bearing assembly as claimed in claim 1, in which the sensor mounting substrate protrudes laterally outwardly from the substrate mounting groove and a wiring connector is mounted on a projecting portion of the substrate.

12. The rotation sensor equipped bearing assembly as claimed in claim 1, in which the bearing unit is a sliding bearing provided in an inner peripheral surface of the sensor housing.

13. The rotation sensor equipped bearing assembly as claimed in claim 1, in which the sensor faces a to-be-detected surface of the encoder through an axial gap.

14. The rotation sensor equipped bearing assembly as claimed in claim 1, in which the sensor faces a to-be-detected surface of the encoder through a radial gap.

15. The rotation sensor equipped bearing assembly as claimed in claim 1, in which the encoder and the sensor have a point of origin detecting function.

16. The rotation sensor equipped bearing assembly as claimed in claim 1, in which the sensor is an optical sensor.

17. A rotation sensor equipped bearing assembly comprising:

a sensor housing having a first end portion thereof provided with a bearing unit that contacts a shaft;

an encoder mounted on the shaft and positioned within the sensor housing; and a sensor mounting substrate having mounted thereon a sensor and being removably installed within the sensor housing from a second end portion of the sensor housing that is opposite to the first end portion, in which the sensor housing has a substrate installation window defined in a portion of a circumferential direction so as to extend from inside to outside, and vice versa, in a radial direction and also has a substrate receiving portion comprised of a projection or a recess accommodated within the substrate installation window, and in which the sensor mounting substrate is received by the substrate receiving portion to be arranged within the substrate installation window and a wiring connected with the sensor mounting substrate is drawn from the substrate installation window towards an outer diametric side.

18. A rotation sensor equipped bearing assembly comprising:

a sensor housing having a first end portion thereof provided with a bearing unit that contacts a shaft;

an encoder mounted on the shaft and positioned within the sensor housing; and a sensor mounting substrate having mounted thereon a sensor and being removably installed within the sensor housing from a second end portion of the sensor housing that is opposite to the first end portion, in which the shaft has a cutout defined in a circumferential portion of an outer peripheral surface, which cutout is of a shape formed by cutting to a flat surface, and in which the encoder has a circumferential portion of an inner peripheral surface provided with a flat surface area of a flat surface, which engages in the cutout.

19. A rotation sensor equipped bearing assembly comprising:

a sensor housing having a first end portion thereof provided with a bearing unit that contacts a shaft;

an encoder mounted on the shaft and positioned within the sensor housing, the encoder including a to-be-detected surface having a light transmitting portion, formed by applying a slitting process, to transmit light, and a light reflecting portion to reflect light, the light transmitting portion and the light reflecting portion being circumferentially alternately juxtaposed in the to-be-detected surface of the encoder; and a sensor mounting substrate having mounted thereon an optical sensor and being removably installed within the sensor housing from a second end portion of the sensor housing that is opposite to the first end portion.

20. The rotation sensor equipped bearing assembly as claimed in claim 19, in which the light reflecting portion comprises a reflective material painted on the to-be-detected surface of the encoder.

21. The rotation sensor equipped bearing assembly as claimed in claim 19, in which a recess and a projection are circumferentially alternately formed in the to-be-detected surface of the encoder.

\* \* \* \* \*